US012802262B2

(12) United States Patent
Tai et al.

(10) Patent No.: US 12,802,262 B2
(45) Date of Patent: Nov. 17, 2026

(54) TRAINING APPARATUS, CLASSIFICATION APPARATUS, TRAINING METHOD, AND CLASSIFICATION METHOD

(71) Applicant: NEC Corporation, Tokyo (JP)

(72) Inventors: Tsenjung Tai, Tokyo (JP); Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 18/712,816

(22) PCT Filed: Nov. 30, 2021

(86) PCT No.: PCT/JP2021/043739
§ 371 (c)(1),
(2) Date: May 23, 2024

(87) PCT Pub. No.: WO2023/100215
PCT Pub. Date: Jun. 8, 2023

(65) Prior Publication Data

US 2025/0022164 A1 Jan. 16, 2025

(51) Int. Cl.
*G06T 7/73* (2017.01)
*G06V 10/774* (2022.01)

(52) U.S. Cl.
CPC .............. *G06T 7/73* (2017.01); *G06V 10/774* (2022.01); *G06T 2207/10044* (2013.01); *G06T 2207/20081* (2013.01); *G06T 2207/20084* (2013.01)

(58) Field of Classification Search
CPC ............. G06T 7/73; G06T 2207/10044; G06T 2207/20081; G06T 2207/20084;
(Continued)

(56) References Cited

U.S. PATENT DOCUMENTS

2016/0019458 A1* 1/2016 Kaufhold ................ G01S 7/417 706/20
2020/0250468 A1* 8/2020 Kim ....................... G06N 20/00
(Continued)

FOREIGN PATENT DOCUMENTS

WO WO-2019045982 A1 * 3/2019 ............ G06V 10/82

OTHER PUBLICATIONS

Extended European Search Report for EP Application No. 21966302.8, dated on Dec. 5, 2024.

*Primary Examiner* — Stephen G Sherman
(74) *Attorney, Agent, or Firm* — Sughrue Mion, PLLC

(57) ABSTRACT

The feature extraction section extracts source domain structural features from input source domain image data and, extracting target domain structural features from input target domain image data. The rigid transformation section generates transformed structural features by rigid transforming the structural features with reference to conversion parameters. The relighting section generates new view features with reference to the transformed structural features and the conversion parameters in a way that new view features approximate the structural features which are extracted from input image data at the views indicated by the conversion parameters. The class prediction section predicts source domain class predictions from the source domain structural features and the source domain new view features, and predicting target domain class predictions from the target domain structural features and the target domain new view features. The updating section updates at least one of the feature extraction section, the relighting extraction section, and the class prediction extraction section.

12 Claims, 16 Drawing Sheets

(58) Field of Classification Search
CPC ...... G06V 10/774; G06V 10/80; G06V 10/82; G06F 18/253; G06N 3/045
See application file for complete search history.

(56) References Cited

U.S. PATENT DOCUMENTS

| | | | | |
|---|---|---|---|---|
| 2020/0264300 | A1* | 8/2020 | Rostami | G01S 13/867 |
| 2021/0019629 | A1 | 1/2021 | Chidlovskii | |

* cited by examiner

TRAINING APPARATUS, CLASSIFICATION APPARATUS, TRAINING METHOD, AND CLASSIFICATION METHOD

This application is a National Stage Entry of PCT/JP2021/043739 filed on Nov. 30, 2021, the contents of all of which are incorporated herein by reference, in their entirety.

TECHNICAL FIELD

The present invention relates to a training apparatus, a classification apparatus, a training method, and a classification method.

BACKGROUND ART

Neural networks require large amounts of labeled data to train huge parameters. However, collecting large amounts of labeled data is expensive and time-consuming. It is conceivable that the knowledge from another domain is transferred to a new target domain in order to solve the problem.

Using a classifier as an example, the "target domain" is a domain that the classifier targets. An example of the target domain is a set of real SAR (Synthetic Aperture Radar) images. The above another domain is called the "source domain". An example of the source domain is a set of simulated images automatically generated by a simulator based on SAR imaging mechanism. However, images in the source domain may be obtained by other methods. For example, images in the source domain are another real SAR image dataset which were obtained several years ago.

CITATION LIST

Patent Literature

[NPL 1] Xiang Xu et al., "d-SNE: Domain Adaptation using Stochastic Neighborhood Embedding", Proceedings of the IEEE/CVF Conference on Computer Vision and Pattern Recognition (CVPR), 2019

SUMMARY OF INVENTION

Technical Problem

The use of d-SNE makes it possible to transfer knowledge in the source domain to the target domain. Take the example of a classifier that classifies an object into Class 1 or Class 2. With d-SNE, objects in the images of the target domain can be classified based on features of the objects of the same category in the images of the source domain.

To safely transfer the knowledge from the source domain to the target domain, there are two challenges to resolve: the domain gap and the intra-class variance. First, different domains usually have different characteristics such as imaging resolutions due to different data collection conditions. These different characteristics cause the domain gap. Second, within the same domain, the collected images of objects from the same category may look very different due to different shooting angles or other factors such as illumination conditions. This causes the intra-class variance. Any one of the two challenges, if is not resolved, results in the classifier unable to classify a new target domain image with an unseen target domain factor in the test phase and beyond.

d-SNE fails to address the above two challenges simultaneously because it does not take intra-class variance into considerations when reducing the domain gap. As an example, the domain gap caused by differences in imaging resolutions is assumed and the intra-class variance caused by differences in image shooting angles is assumed. A classifier based on neural networks can be trained using both images from the source domain and images from the target domain to reduce the domain gap. However, in the case that only a very limited number of images in the target domain are available during the training phase, the domain gap cannot be correctly minimized for those factors that are present in the source domain images but are not present in the target domain training images. For example, at the training phase, the source domain may contain plenty of images of objects from Class 1 and plenty of images of objects from Class 2 which are taken at various shooting angles, whereas the target domain may only contain a small number of images of objects from Class 1 and a small number of images of objects from Class 2 which are taken at one or two shooting angles. In this case, the domain gap between the images taken at angles that are present in the source domain but are not present in the target domain cannot be correctly reduced. In the testing phase, the image of an object in the target domain at an unseen shooting angle which is not covered by the small number of target domain training images cannot be correctly classified. This is because the domain gap at these shooting angles is not minimized and thus the knowledge cannot be safely transferred from the source domain to the target domain at these shooting angles. With d-SNE, the intra-class variance caused by images taken at angles other than that one or two angles used by the target domain training images are not considered when the domain gap is minimized.

As a result, it is difficult for the classifier to decide into which class to classify the new image with an unseen target domain factor. As an example of a factor, the shooting angle of an image is assumed. The factor may be other things that can contribute to intra-class variance, such as illumination conditions. When factor differences exist, the features extracted from the images of the same category but at different shooting angles differ from each other. A simplest definition of the intra-class variance can be the squared deviation of features from the same category from their population mean. The intra-class variance can be also expressed as a more complicated variance among the features extracted from images of the same category.

The domain gap means a difference in data distribution or characteristics between domain A (in this example, the target domain) and domain B (in this example, the source domain). For example, the collected datasets will have different characteristics. As an example of a characteristic, the resolutions of an image is assumed. The characteristic may be other things that can contribute to the domain gap, such as different imaging sensors, different object's backgrounds and so on.

When characteristic differences exist, the average features extracted from images belonging to domain A will differ from the average features extracted from images belonging to domain B. A simplest definition of the domain gap can be expressed as the distance between the mean values of both. The domain gap can be also expressed as a more complicated distance between the data distributions of different domains. More specifically, the domain gap can be also expressed as maximum mean discrepancy.

The purpose of the present invention is to provide a training apparatus, a classification apparatus, a training method, and a classification method that enable a classifier to correctly classify an object in the target domain where a new factor is present whereas the new factor has never been seen in the target domain training data by the classifier.

Solution to Problem

An exemplary aspect of a training apparatus includes one or more feature extraction means for extracting source domain structural features from input source domain image data, and extracting target domain structural features from input target domain image data, rigid transformation means for generating transformed structural features by rigid transforming the structural features with reference to conversion parameters, one or more relighting means for generating new view features with reference to the transformed structural features and conversion parameters in a way that the new view features approximate the structural features which are extracted from input image data at the views indicated by the conversion parameters, one or more class prediction means for predicting source domain class predictions from the source domain structural features and the source domain new view features, and predicting target domain class predictions from the target domain structural features and the target domain new view features, and updating means for updating at least one of the one or more feature extraction means, the one or more relighting means, and the one or more class prediction means with reference to a merged loss computed from a source domain classification loss computed with reference to the source domain class predictions and the source domain ground truth class labels, a target domain classification loss computed with reference to the target domain class predictions and the target domain ground truth class labels, a conversion loss computed with reference to the source domain structural features, the source domain new view features, the target domain structural features and the target domain new view features, and a grouping loss computed with reference to the source domain structural features, the source domain new view features, the target domain structural features and the target domain new view features.

An exemplary aspect of a classification apparatus includes feature extraction means for extracting structural features from input image data, and class prediction means for predicting class prediction values from the structural features, wherein at least one of the feature extraction means and the class prediction means has been trained with reference to new view features obtained by converting the structural features.

An exemplary aspect of a training method includes extracting source domain structural features from input source domain image data, and extracting target domain structural features from input target domain image data, using one or more feature extraction means, generating transformed structural features by rigid transforming the structural features with reference to conversion parameters, using one or more rigid transformation means, generating new view features with reference to the transformed structural features and conversion parameters in a way that the new view features approximate the structural features which are extracted from input image data at the views indicated by the conversion parameters, using one or more relighting means, predicting source domain class predictions from the source domain structural features and the source domain new view features, and predicting target domain class predictions from the target domain structural features and the target domain new view features, using one or more class prediction means, and updating at least one of the one or more feature extraction means, the one or more relighting means, and the one or more class prediction means with reference to a merged loss computed from a source domain classification loss computed with reference to the source domain class predictions and the source domain ground truth class labels, a target domain classification loss computed with reference to the target domain class predictions and the target domain ground truth class labels, a conversion loss computed with reference to the source domain structural features, the source domain new view features, the target domain structural features and the target domain new view features, and a grouping loss computed with reference to the source domain structural features, the source domain new view features, the target domain structural features and the target domain new view features.

An exemplary aspect of a classification method includes extracting structural features from input image data by feature extraction means and predicting class predictions by class prediction means from the structural features, wherein at least one of the feature extraction means and the class prediction means has been trained with reference to new view features obtained by converting the structural feature.

An exemplary aspect of a training program causes a computer to execute extracting source domain structural features from input source domain image data, and extracting target domain structural features from input target domain image data, using one or more feature extraction means, generating transformed structural features by rigid transforming the structural features with reference to conversion parameters, using one or more rigid transformation means, generating new view features with reference to the transformed structural features and conversion parameters in a way that the new view features approximate the structural features which are extracted from input image data at the views indicated by the conversion parameters, using one or more relighting means, predicting source domain class predictions from the source domain structural features and the source domain new view features, and predicting target domain class predictions from the target domain structural features and the target domain new view features, using one or more class prediction means, and updating at least one of the one or more feature extraction means, the one or more relighting means, and the one or more class prediction means with reference to a merged loss computed from a source domain classification loss computed with reference to the source domain class predictions and the source domain ground truth class labels, a target domain classification loss computed with reference to the target domain class predictions and the target domain ground truth class labels, a conversion loss computed with reference to the source domain structural features, the source domain new view features, the target domain structural features and the target domain new view features, and a grouping loss computed with reference to the source domain structural features, the source domain new view features, the target domain structural features and the target domain new view features.

An exemplary aspect of a classification program causes a computer to execute extracting structural features from input image data, using feature extraction means, and predicting class prediction values from the feature values, using class prediction means, wherein at least one of the feature extraction means and the class prediction means has been trained with reference to new view features obtained by converting the structural features.

Advantageous Effects of Invention

According to the present invention, it allows the classifier to correctly classify an object in the target domain where a new factor is present whereas the new factor has never been seen in the target domain training data by the classifier.

DESCRIPTION OF EMBODIMENTS

Hereinafter, the example embodiment of the present invention is described with reference to the drawings. In each of the example embodiments described below, SAR images are assumed as the images. However, the images are not limited to SAR images. As an example, the images in a source domain and a target domain can also be optical images, for example, images photographed by a smart phone.

Example Embodiment 1

Figure 1:
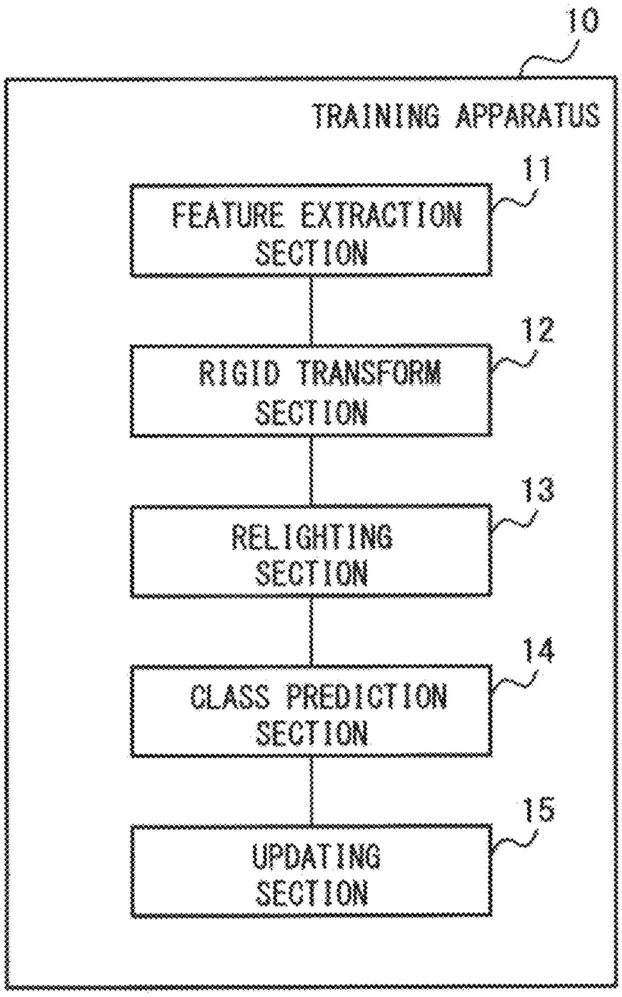
FIG. 1 is a block diagram showing a configuration example of a training apparatus of the first example embodiment.

FIG. 1 is a block diagram showing a configuration example of a training apparatus of the first example embodiment.

The training apparatus 10 shown in FIG. 1 comprises a feature extraction section 11, a rigid transformation section 12, a relighting section 13, a class prediction 14 section, and an updating section 15. Although a single feature extraction section 11, a single rigid transformation section 12, a single relighting section 13, and a single class prediction section 14 are illustrated in FIG. 1, a plurality of feature extraction sections 11, rigid transformation sections 12, relighting sections 13, and class prediction section 14 may be installed.

The feature extraction section 11 extracts source domain structural features from input source domain image data, and extracts target domain structural features from input target domain image data.

The rigid transformation section 12 generates structural-transformed features by transforming the structural features with reference to conversion parameters. The structural features which are transformed are sometimes referred to as "transformed structural features".

The relighting section 13 generates new view features with reference to the transformed structural features and conversion parameters in a way that the new view features approximate the structural features which are extracted from input image data at the new views indicated by the conversion parameters.

The class prediction section 14 predicts class predictions from the structural features.

The updating section 15 updates at least one of one or more feature extraction sections 11, at least one of one or more relighting sections 13, and at least one of one or more class prediction sections 14. When updating, the updating section 15 refers to at least one or more following items (i)-(iv).

(i) a source domain classification loss computed with reference to the source domain class predictions and the source domain ground truth class labels, (ii) a target domain classification loss computed with reference to the target domain class predictions and the target domain ground truth class labels, (iii) a grouping loss computed with reference to at least one or more features from the source domain structural features, the source domain new view features, the target domain structural features, the target domain new view features and the corresponding class labels of each involved feature, (iv) a conversion loss computed with reference to at least one or more features from the source domain structural features, the source domain new view features, the target domain structural features and the target domain new view features.

Figure 3:
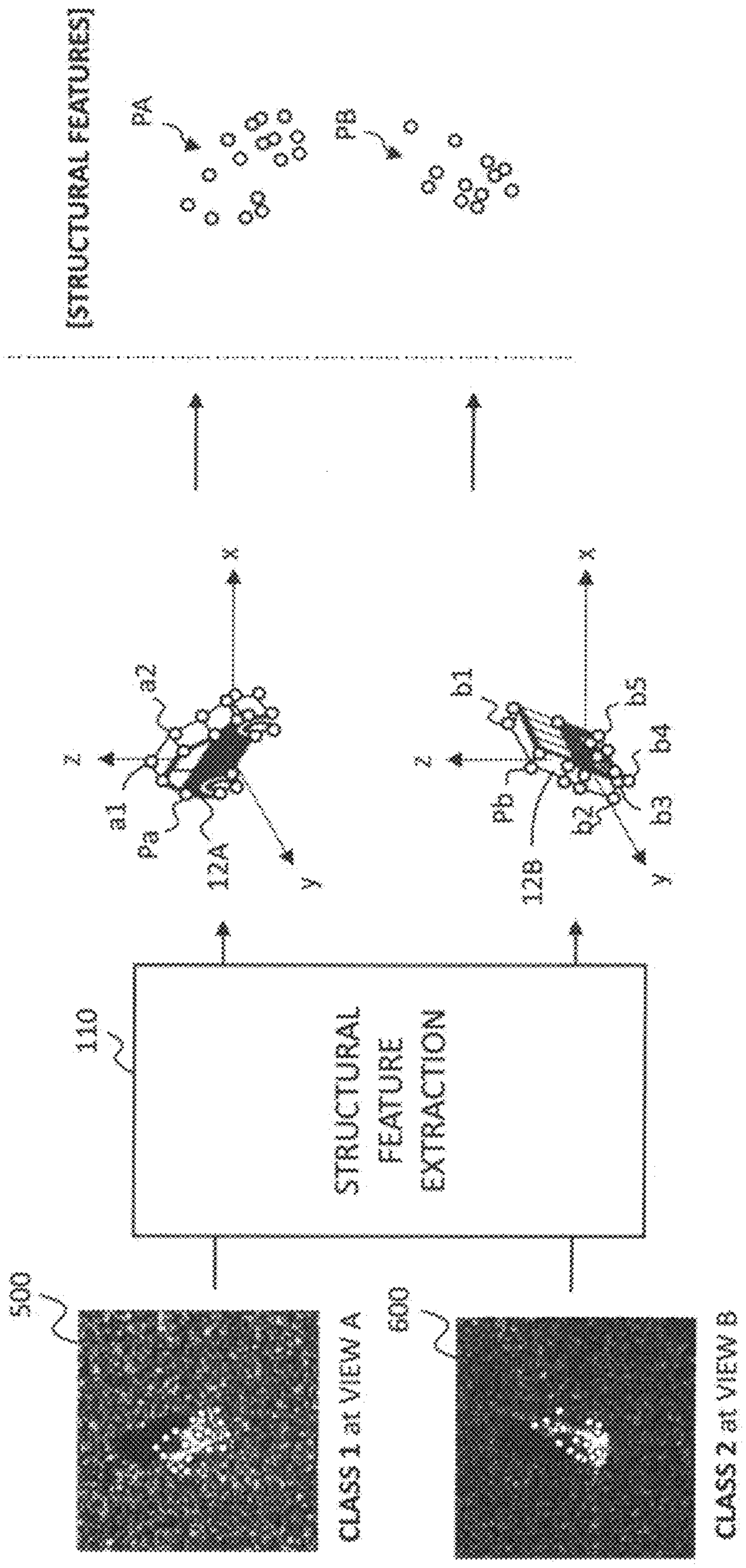
FIG. 3 is an explanatory diagram for explaining structural features.
Figure 4:
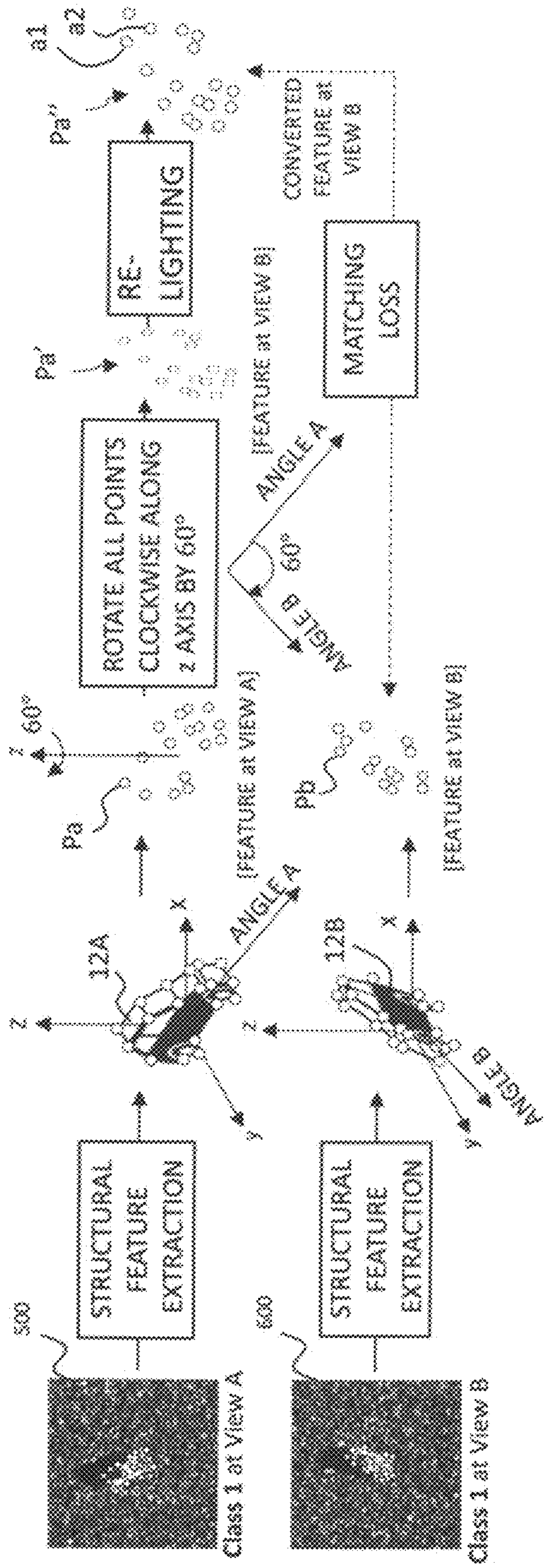
FIG. 4 is an explanatory diagram for explaining structural features and structural conversion.

Next, "structural features" and "structural features conversion" is described with reference to FIGS. 3 and 4. FIGS. 3 and 4 are explanatory diagrams for explaining structural features and structural features conversion. The image pair in FIGS. 3 and 4. can be two images from the source domain, or two images from the target domain.

In the example shown in FIGS. 3 and 4, a structural feature extraction function 110 extracts feature points Pa of an object 12A from an image 500 at a view A. The feature points Pa forms the structural feature PA. The structural feature extraction function 110 extracts feature points Pb of an object 12B from an image 600 at a view B. The feature points Pb forms the structural feature PB. As an example, features PA, PB are 3-dimensional (3D) structural features. Note that the structural feature extraction function 110 are realized by the feature extraction section 11. For example, the image 500 and the image 600 belong to the source domain. Objects 12A, 12B are projected onto 2D plane and form the images 500,600, respectively. In the example shown in FIGS. 3 and 4, the object is a vehicle.

A feature converter consisting the rigid transformation section 12 and the relighting section 13 performs structural feature conversion. Specifically, the structural feature conversion converts structural features at view A to view B.

Suppose that the feature points a1 and a2 cannot be recovered from the image 500 at view A because they are hidden. That is, the feature points Pa other than the feature points a1 and a2 can be recovered. In addition, suppose that the feature points b1 to b5 cannot be recovered from the image 600 at view B because they are hidden. That is, the feature points Pb other than the feature points b1 to b5 can be recovered. In FIG. 3, only one feature point Pa is marked with a sign, but all feature points except for feature points a1 and a2 are recoverable feature points Pa. In addition, although only one feature point Pb is marked with a sign, all feature points except for feature points b1 to b5 are recoverable feature points Pb.

The rigid transformation section 12 rotates all feature points Pa clockwise along z axis so that the direction of the object 12A is directed to the same direction as it of the object 12B. In other words, the rigid transformation section 12 changes view A of the object 12A to view B. As an example, 60 degree is illustrated in FIG. 4. The rigid transformation yields the feature point Pa'. Hereinafter, this operation by the rigid transformation section 12 is sometimes referred to as a view change. It is an example that the rigid transformation section 12 rotates the feature points Pa so that the direction of the object 12A faces the same direction as the object 12B. The rigid transformation section 12 can move the object in any direction and can rotate the object at any angle. Specifically, the rigid transformation section 12 performs rigid transformation according to input conversion parameters, for example.

The relighting section 13 modifies feature points Pa' based on the same conversion parameters received by the rigid transformation section 12 to generate converted feature points Pa". The converted feature points Pa" recover the feature points a1, a2 as shown in FIG. 4 that cannot be extracted from the image 500 at view A as shown in FIG. 3. Moreover, the relighting section 13 determines how the properties such as intensity and color of each point, the feature point shown in FIG. 4 as an example, should change after view change. The converted feature points Pa" correspond to the new view features above. The relighting section is trained to carry out this kind of conversion by minimizing the matching loss. The matching loss, as shown in FIG. 4, is the difference between the converted feature points Pa", which is now at view B, and the feature points Pb which is extracted from the image 600 at view B but is not converted.

By referring to the large number of image pairs in the source domain, the rigid transformation section together with the relighting section become good at outputting new view features at some desired view by converting features at arbitrary input view, and the new view features at the desired view are very similar to the features directly extracted from images at those desired views without any conversion. Here, the image 500 and 600 are from the source domain. Structural knowledge is transferred from the source domain to the target domain by applying the structural feature extraction section, the rigid transformation section and the relighting section to images in the target domain. By converting target domain structural features, converted feature points at new views which are not available before in the target domain can be created.

(Technical Effects of the Present Example Embodiment)

The data belonging to the source domain is greater in data size than the data belonging to the target domain. Moreover, the data belonging to the source domain contains more labeled data, as compared with the data belonging to the target domain. Here, the term "labeled data" refers to data that is labeled with "ground truth", for example. The labeled data can be used by the training apparatus for supervised learning or for semi-supervised learning. In this example embodiment, it becomes possible to learn a classifier for general data in the target domain using abundant data from external datasets (i.e. "source domains") in addition to a limited number of target domain data by transferring the structural knowledge from external datasets to the target domain. As a result, accuracy of classification is improved.

Example Embodiment 2

Figure 2:
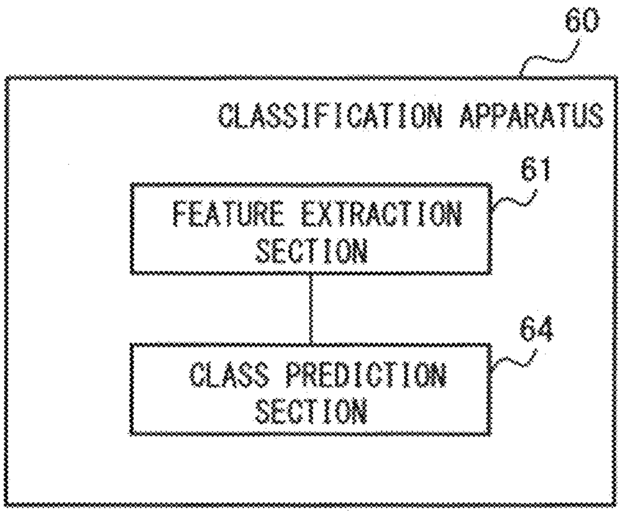
FIG. 2 is a block diagram showing a configuration example of a classification apparatus of the second example embodiment.

FIG. 2 is a block diagram showing a configuration example of a classification apparatus of the second example embodiment.

The classification apparatus 60 shown in FIG. 2 comprises a feature extraction section 61 and a class prediction section 64.

The feature extraction section 61 extracts structural features from input image data. The class prediction section 64 predicts class prediction values from the structural features. At least one of the feature extraction section 61 and the class prediction section 64 has been trained with reference to the new view features obtained by converting the structural features by the rigid transformation section 12 and the relighting section 13.

(Technical Effects of the Present Example Embodiment)

In this example embodiment, the classification apparatus 60 provides a preferable classification process even in a case where target domain training images having a limited variation of shooting angles, for example, are available.

Hereinafter, specific example embodiments will be explained.

Example Embodiment 3

(Configuration of Training Apparatus)

Figure 5:
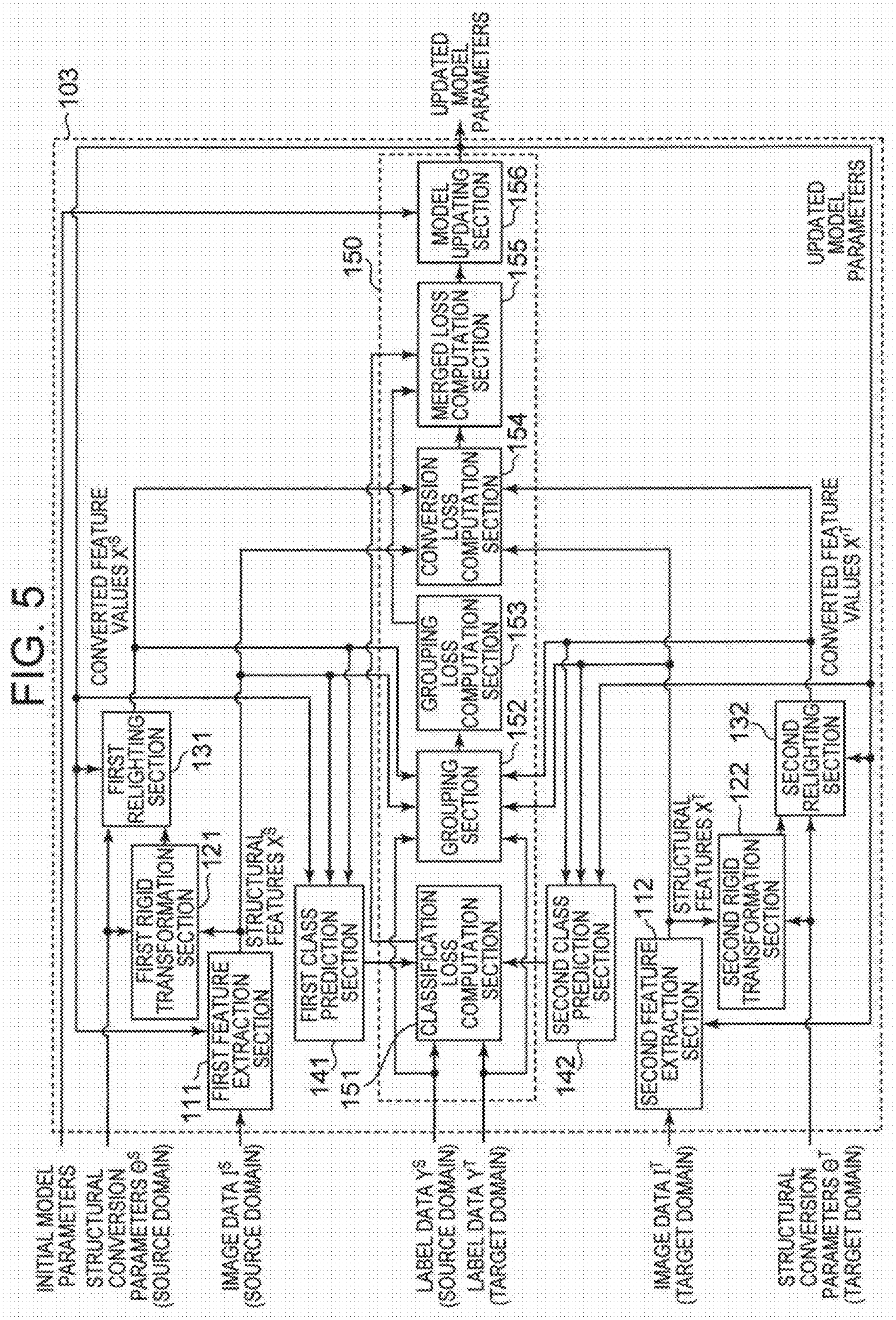
FIG. 5 is a block diagram showing a configuration example of a training apparatus of the third example embodiment.

FIG. 5 is a block diagram showing a configuration example of a training apparatus of the third example embodiment.

The training apparatus 103 shown in FIG. 5 comprises a first feature extraction section 111, a second feature extraction section 112, a first rigid transformation section 121, a second rigid transformation section 122, a first relighting section 131, a second relighting section 132, a first class prediction section 141, a second class prediction section 142, and an updating section 150.

In FIG. 5 and the other figures, unidirectional arrows are used, but the unidirectional arrows are intended to represent the flow of data in a straightforward manner, and are not intended to exclude bidirectionality.

Each of the first feature extraction section 111 and the second feature extraction section 112 corresponds to the feature extraction section 11 shown in FIG. 1. Each of the first rigid transformation section 121 and the second rigid transformation section 122 corresponds to the rigid transformation section 12 shown in FIG. 1. Each of the first relighting section 131 and the second relighting section 132 corresponds to the relighting section 13 shown in FIG. 1. The class prediction section 141 and the second class prediction section 142 corresponds to the class prediction section 14 shown in FIG. 1. The updating section 150 corresponds to the updating section 15 shown in FIG. 1.

(Extraction Section)

The first feature extraction section 111 and the second feature extraction section 112 can be configured as a single section. The rigid transformation section 121 and the second rigid transformation section 122 can be configured as a single section. The first relighting section 131 and the second relighting section 132 can be configured as a single section. The class prediction section 141 and the second class prediction section 142 can be configured as a single section.

The updating section 150 includes a classification loss computation section 151, a grouping section 152, a grouping loss computation section 153, a conversion loss computation section 154, a merged loss computation section 155, and a model updating section 156.

Figure 6:
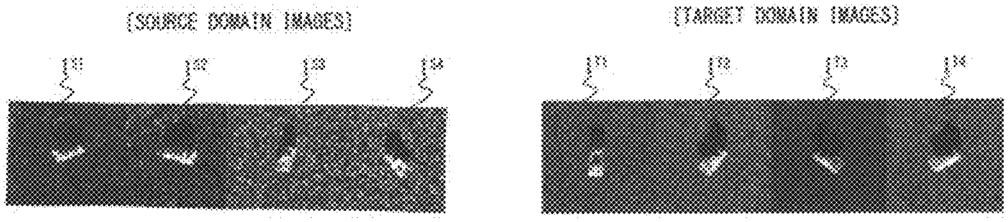
FIG. 6 is an explanatory diagram showing an example of target domain image data and source domain image data.

Input image data (source domain image data) $I^S$ belonging to a source domain is inputted to the first feature extraction section 111. The input image data $I^S$ may be an image which has a plurality of regions, for example. As another example, the input image data $I^S$ may be a batch of images as illustrated on the left side of FIG. 6. In the example on the left side of FIG. 6, the input image data $I^S$ includes 4 images ($I^{S1}$, $I^{S2}$, $I^{S3}$, $I^{S4}$), each of which represents an object. The batch of images shown on the left side of FIG. 6 is a collection of images obtained by simulation. However, source domain images can be obtained in a variety of ways. For, example, they can be obtained from some existing database. There are many existing datasets online which are free or paid for scientific usage.

A relation of the images $I^{S1}$ and $I^{S2}$ is as follows. The image $I^{S2}$ has a different angle from the image $I^{S1}$. As an example, the image $I^{S2}$ may be an image which contains a same object or contains another object from the same class category as the image $I^{S1}$, but has been taken at a different shooting angle from the image $I^{S1}$. The images $I^{S1}$ and $I^{S2}$ may be taken at the same time or at different times.

In a similar manner, the image $I^{S4}$ has a different angle from the image $I^{S3}$. As an example, the image $I^{S4}$ may be an image which contains a same object or contains another object from the same class category as the image $I^{S3}$, but has been taken at a different shooting angle from the image $I^{S3}$. The images $I^{S3}$ and $I^{S4}$ may be taken at the same time or at different times.

The first feature extraction section 111 extracts features (source domain structural features), i.e., the source domain feature values $X^S$ from the input source domain image data $I^S$. Specifically, the first feature extraction section 111 extracts the features of the objects in the image belonging to the source domain as the source domain feature values. The feature values $X^S$ extracted by the first feature extraction section 111 are supplied to the first rigid transformation section 121, the first class prediction section 141, the grouping section 152, and the conversion loss computation section 154.

For example, the first feature extraction section 111 can be a convolutional neural network (CNN), can be a recurrent neural network (RNN), or can be any of other neural networks or feature extractors. However, a specific configuration of the first feature extraction section 111 does not limit the present example embodiment and example embodiments below.

The source domain feature values $X^S$ may be expressed as a form of a vector. Specifically, as an example, $X^S$ may be expressed as a vector such as follows. However, the features values may be expressed in a format other than a vector.

$$X^S = [x_{s1}, x_{s2}, x_{s3}, x_{s4}] \quad \text{(Eq. 1)}$$

$X^S$ has 4 components, which correspond to the respective input images ($I^{S1}$, $I^{S2}$, $I^{S3}$, $I^{S4}$). Since the feature values may be expressed as a vector, the feature values may be referred to as a feature vector.

Input image data (target domain image data) $I^T$ belonging to a target domain is inputted to the first feature extraction section 112. The input image data $I^T$ may be an image which has a plurality of regions, for example. As another example, the input image data $I^T$ may be a batch of images as illustrated on the right side of FIG. 6. In the example on the right side of FIG. 6, the input image data $I^T$ includes 4 images ($I^{T1}$, $I^{T2}$, $I^{T3}$, $I^{T4}$), each of which represents an object.

A relation of the images $I^{T1}$ and $I^{T2}$ is as follows. The image $I^{T2}$ has a different angle from the image $I^{T1}$. As an example, the image $I^{T2}$ may be an image which contains a same object or another object of the same class category as the image $I^{T1}$, but has been taken at a different shooting angle from the image $I^{T1}$. The images $I^{T1}$ and $I^{T2}$ may be taken at the same time or at different times.

In a similar manner, the image $I^{T4}$ has a different angle from the image $I^{T3}$. As an example, the image $I^{T4}$ may be an image which contains a same object or another object of the same class category as the image $I^{T3}$, but has been taken at a different shooting angle from the image $I^{T3}$. The images $I^{T3}$ and $I^{T4}$ may be taken at the same time or at different times.

The second feature extraction section 112 extracts features, i.e., target domain feature values (target domain structural features) XT from the input target domain image data $I^T$. Specifically, the second feature extraction section 112 extracts the features of the objects in the image belonging to the target domain as the target domain feature values. The feature values XT extracted by the second feature extraction section 112 are supplied to the second rigid transformation section 122, the second class prediction section 142, the grouping section 152, and the conversion loss computation section 154.

For example, the second feature extraction section 112 can be a convolutional neural network (CNN), can be a recurrent neural network (RNN), or can be any of other neural networks or feature extractors. However, a specific configuration of the second feature extraction section 112 does not limit the present example embodiment and example embodiments below.

The target domain feature values $X^T$ may be expressed as a form of a vector. Specifically, as an example, $X^T$ may be expressed as a vector such as follows. However, the features values may be expressed in a format other than a vector.

$$X^T = [X^{T1}, X^{T2}, X^{T3}, X^{T4}] \quad \text{(Eq. 2)}$$

$X^T$ has 4 components, which correspond to the respective input images ($I^{T1}$, $I^{T2}$, $I^{T3}$, $I^{T4}$). Since the feature values may be expressed as a vector, the feature values may be referred to as a feature vector.

(Rigid Transformation Section)

The structural conversion parameters $\Theta^S$ are input to the first rigid transformation section 121, and the source domain feature values $X^S$ are input from the first feature extraction section 111. The first rigid transformation section 121 applies rigid transformation to the source domain feature values $X^S$.

As an example, if the features are represented by 3D positions (for example, coordinates), the structural conversion parameter $\Theta^S$ includes information on the direction and rotation angle of the rotation axis. In this case, the first rigid transformation section 121 performs the rigid transformation by executing the following operation.

[Math. 1]

$$\begin{bmatrix} x' \\ y' \\ z' \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} x \\ y \\ z \end{bmatrix} \quad \text{(Eq. 3)}$$

$$\begin{bmatrix} x' \\ y' \\ z' \end{bmatrix} = \begin{bmatrix} 1 & 0 & 0 \\ 0 & \cos\theta & -\sin\theta \\ 0 & \sin\theta & \cos\theta \end{bmatrix} \begin{bmatrix} x \\ y \\ z \end{bmatrix} \quad \text{(Eq. 3-2)}$$

$$\begin{bmatrix} x' \\ y' \\ z' \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} x \\ y \\ z \end{bmatrix} \quad \text{(Eq. 3-3)}$$

In Equation 3, x, y, z denote coordinates before transformation, x', y', z' denote coordinates after transformation, and θ denotes the rotation angle. Note that the matrix of Equation 3 rotates an object around the z axis. However, in the example embodiment, it is available to rotate an object around the x or y axis as shown in Equation 3-2 or 3-3.

As another example, if the features are represented by a set of voxels, the structural conversion parameter OS also includes information on the direction and rotation angle of the rotation axis. In this case, the first rigid transformation section 121 performs the rigid transformation by rotating voxels by the rotation angle.

Various rigid transformation systems can be applied, including but not limited to the above examples. Therefore, the first rigid transformation section 121 can perform the rigid transformation using any rigid transformation system. The first rigid transformation section 121 obtains transformed structural features.

The structural conversion parameters OT are input to the second rigid transformation section 122, and the target domain features values $X^T$ are input from the second feature extraction section 112. The second rigid transformation section 122 applies rigid transformation to the target domain features values $X^T$.

When modifying the target domain features values $X^T$, the second rigid transformation section 122 operates in the same way as the first rigid transformation section 121 to perform the rigid transformation. Therefore, the second rigid transformation section 122 can obtain transformed structural features in the same way as the first rigid transformation section 121.

(Relighting Section)

The structural conversion parameter $\Theta^S$ is input to the first relighting section 131. In addition, the transformed structural features are also input to the first relighting section 131 from the first rigid transformation section 121. The first relighting section 131 modifies the transformed structural features inputted from the first rigid transformation section 121.

The first relighting section 131 calculates the properties such as brightness, RGB color, normal, etc. at each spatial position. Note that if the structural feature represented by a set of 3D points, then every x,y,z-coordinate is one spatial position, and if the structural feature represented by a set of voxels, then each voxel is one spatial position. The new values of properties for each point or voxel depend on the structural conversion parameters OS, the original values of the properties and the new location of that point or voxel. The new values of properties correspond to structural features (converted source domain structural features) after rigid transformation. The original values of the properties correspond to structural features before rigid transformation.

By the above operation, the first relighting section 131 can obtain structural features which appear as if they are extracted from an image at another view, based on the structural features in one view.

For example, the first relighting section 131 can be a convolutional neural network (CNN), can be a recurrent neural network (RNN), or can be any of other neural networks or feature extractors. However, a specific configuration of the first relighting section 131 does not limit the present example embodiment and example embodiments below.

The structural conversion parameter OT is input to the second relighting section 132. In addition, the transformed structural features are also input to the second relighting section 132 from the second rigid transformation section 122. The second relighting section 132 modifies the transformed structural features inputted from the second rigid transformation section 122.

The second relighting section 132 calculates the properties such as brightness, RGB color, normal, etc. at each spatial position. If the structural feature represented by a set of 3D points, then every x,y,z-coordinate is one spatial position, and if the structural feature represented by a set of voxels, then each voxel is one spatial position. The new values of properties for each point or voxel depend on the structural conversion parameters $\Theta^T$, the original values of the properties and the new location of that point or voxel. The new values of properties correspond to structural features (converted target domain structural features) after rigid transformation. The original values of the properties correspond to structural features before rigid transformation.

By the above operation, the second relighting section 132 can obtain structural features which appear as if they are extracted from an image at another view, based on the structural features in one view.

For example, the second relighting section 132 can be a convolutional neural network (CNN), can be a recurrent neural network (RNN), or can be any of other neural networks or feature extractors. However, a specific configuration of the second relighting section 132 does not limit the present example embodiment and example embodiments below.

(Prediction Section)

The first class prediction section 141 predicts source domain prediction values from the source domain feature values extracted by the first feature extraction section 111 and from the converted feature values (converted source domain feature values) $X'^S$ generated by the first relighting section 131.

Specifically, the first class prediction section 141 predicts source domain class prediction values (class probability) $P^S$ from the source domain feature values $X^S$ and predicts source domain class prediction values (class probability) of the converted feature values CPS from the converted source domain structural feature values $X'^S$.

For example, the first class prediction section 141 can be a convolutional neural network (CNN), can be a recurrent neural network (RNN), or can be any of other neural networks or feature extractors. However, a specific configuration of the first class prediction section 141 does not limit the present example embodiment and example embodiments below.

The source domain class prediction values $P^S$ and the source domain class prediction values of the converted feature values CPS which have been outputted by the first class prediction section 141 are supplied to the classification loss computation section 151.

For example, the first class prediction section 141 compares each component of the source domain feature values $X^S$ with a certain threshold to determine the source domain class prediction values $P^S$ and compares each component of the converted source domain feature vector $X'^S$ with the same or another threshold to determine the source domain class prediction values of the converted feature values CPS.

As a specific example, from the source domain feature values $X^S$ (the source domain feature vector) $X^S$ as indicated in Eq. 1, and from the converted source domain feature vector $X'^S$, the first class prediction section 141 may output the source domain class prediction values $P^S$ and the source domain class prediction values of the converted feature values CPS as follows.

$$P^S = [0, 0, 1, 1] \quad \text{(Eq. 4)}$$

$$CP^S = [0, 0, 1, 1] \quad \text{(Eq. 5)}$$

$P^S$ has 4 components which correspond to respective components of the source domain feature vector $X^S$. Similarly, $CP^S$ has 4 components which correspond to respective components of the converted source domain feature vector $X'^S$. Since the prediction values may be expressed as a vector, the prediction values may be referred to as a prediction vector.

The second class prediction section 142 predicts target domain prediction values from the target domain feature values extracted by the second feature extraction section 112 and from the converted feature values (converted target domain feature values) $X'^T$ generated by the second relighting section 132.

Specifically, the second class prediction section 142 predicts target domain class prediction values (class probability) PT from the target domain feature values $X^T$ and predicts target domain class prediction values (class probability) of the converted feature values $CP^T$ from the converted target domain structural feature values $X'^T$.

For example, the second class prediction section 142 can be a convolutional neural network (CNN), can be a recurrent neural network (RNN), or can be any of other neural networks or feature extractors. However, a specific configuration of the second class prediction section 142 does not limit the present example embodiment and example embodiments below.

The target domain class prediction values $P^T$ and the target domain class prediction values of the converted feature values $CP^T$ which have been outputted by the second class prediction section 142 are supplied to the classification loss computation section 151.

For example, the second class prediction section 142 compares each component of the target domain feature values $X^T$ with a certain threshold to determine the target domain class prediction values $P^T$ and compares each component of the converted target domain feature vector $X'^T$ with the same or another threshold to determine the target domain class prediction values of the converted feature values $CP^T$.

As a specific example, from the target domain feature vector $X^T$ as indicated in Eq. 2, and from the converted target domain feature vector $X'^T$, the second class prediction section 142 may output the target domain class prediction values $P^T$ and the target domain class prediction values of the converted feature values $CP^T$ as follows.

$$P^T = [0, 0, 1, 0] \quad \text{(Eq. 6)}$$

$$CP^T = [1, 0, 1, 0] \quad \text{(Eq. 7)}$$

$P^T$ has 4 components which correspond to respective components of the target domain feature vector $X^T$. Similarly, $CP^T$ has 4 components which correspond to respective components of the converted target domain feature vector $X'^T$.

(Classification Loss Computation Section)

The classification loss computation section 151 calculates a source domain classification loss (Loss_classification_S) with reference to the source domain class prediction values $P^S$, the source domain class prediction values of the converted feature values CPS and source domain class label data $Y^S$.

Specifically, the classification loss computation section 151 calculates the source domain classification loss with reference to the source domain class prediction values $P^S$, the source domain class prediction values of the converted feature values CPS and source domain class label data $Y^S$. For example, the classification loss computation section 151 calculates the source domain classification loss according to a degree of mismatch between $P^S$ and $Y^S$, and mismatch between CPS and $Y^S$.

As a specific example, in a case where $P^S$ is given by Eq. 4, $CP^S$ is given by Eq. 5 and $Y^S$ is given by the following Eq. 8.

$$Y^S = [0, 0, 1, 1] \quad \text{(Eq. 8)}$$

The classification loss computation section 151 calculates the source domain classification loss as below, because all the components of $P^S$ match the respective corresponding components of $Y^S$, and all the components of $CP^S$ match the respective corresponding components of $Y^S$.

$$\text{Loss\_classification\_S} = 0 \quad \text{(Eq. 9)}$$

Further, the classification loss computation section 151 calculates a target domain classification loss (Loss_classification_T) with reference to the target domain class prediction values $P^T$, the target domain class prediction values of the converted feature values $CP^T$ and target domain class label data $Y^T$.

Specifically, the classification loss computation section 151 calculates the target domain classification loss with reference to the target domain class prediction values $P^T$, the target domain class prediction values of the converted feature values $CP^T$ and target domain class label data $Y^T$. For example, the classification loss computation section 151 calculates the target domain classification loss according to a degree of mismatch between $P^T$ and $Y^T$, and mismatch between $CP^T$ and $Y^T$.

As a specific example, in a case where $P^T$ is given by Eq. 6, $CP^T$ is given by Eq. 7 and $Y^T$ is given by the following Eq. 10.

$$Y^T = [0, 0, 1, 1] \quad \text{(Eq. 10)}$$

The classification loss computation section 151 calculates the target domain classification loss as below, because the 4th component of $P^T$ and the 4th component of $Y^T$ do not match each other, and the 1st and the 4th components of $CP^T$ do not match the corresponding components of $Y^T$.

$$\text{Loss\_classification\_T} = 3 \quad \text{(Eq. 11)}$$

(Grouping Section)

The grouping section 152 generates and outputs, from the source domain feature values $X^S$, the converted source domain feature values $X'^S$, the target domain feature values $X^T$, and the converted target domain feature values $X'^T$, class groups where each class group contains feature values sharing the same class label.

If the class groups are Gr0 and Gr1, Gr0 is a class group whose feature values share the same class label 0. Gr1 is a class group whose feature values share the same class label 1.

(Grouping Loss Computation Section)

The grouping loss computation section 153 calculates a grouping loss (Loss_grouping) with reference to the class groups generated by the grouping section 152.

For example, the grouping loss computation section 153 calculates the grouping loss based on intra class metrics determined with reference to the feature values in a same class and inter class metrics determined with reference to the feature values in different classes.

As a specific example, the grouping loss computation section 153 calculates the grouping loss using the following Equation.

$$\text{Loss\_grouping} = \frac{1}{k} \sum_{g \in Gr} (\text{maximum of intra} - \text{class distance in the feature space} - \text{minimumofinter} - \text{class distance in the feature space} + \text{margin}) \quad \text{(Eq. 12)}$$

This Equation computes the average value of the difference between the maximum intra-class distance and the minimum inter-class distance plus a margin of all class groups Gr. For each class group g, the maximum intra-class distance is computed as the maximum distance between any two feature values within the group g, and the minimum inter-class distance is computed as the minimum distance between any two feature values in which that one feature value is from the group g and the other feature value is from a different group. The margin indicates an allowable minimum value of the difference between the maximum intra-class distance and the minimum inter-class distance for each class group. The average is computed by first taking a summation of the values of the distance difference plus a margin of all class groups, and then divide the sum by the number of class groups.

Specifically, the computation of grouping loss (Loss_grouping) according to Eq. 12 may be expressed as follows.

The grouping loss computation section 153 may first find, in each class group, a pair of feature values which are the most distant each other in the feature space. This type of pair may be referred to as an intra-class pair. The maximum distance between the feature values in the intra-class pair for each class corresponds to the "maximum of intra-class distance in the feature space" in Eq. 12.

The grouping loss computation section 153 may then find, for each class group, a pair of feature values, the feature values in the pair belonging to different classes each other and being the closest each other in the feature space. This type of pair may be referred to as an inter-class pair. The minimum distance between the feature values in the inter-class pair corresponds to the "minimum of inter-class distance in the feature space" in Eq. 12.

Then, the grouping loss computation section 153 may subtract the minimum of inter-class distance in the feature space from the maximum of intra-class distance in the feature space for each class group. The grouping loss may be calculated by any method for computing the distance or similarity between two features in the class groups. The grouping loss may be L1 norm, L2 norm, cosine similarity, or even some other measure which requires learning, etc.

The grouping loss computation section 153 may then add a margin. Adding the margin means that it is required that the quantity of the maximum of intra-class distance in the feature space becomes to be smaller than the minimum of inter-class distance in the feature space by at least a certain value (e.g. if margin=1, for each class group, the maximum of intra-class distance in the feature space becomes to be at least 1 unit smaller than the minimum of inter-class distance in the feature space).

After carrying out the above calculation for each class group, the grouping loss computation section 153 may then take the summation over all class groups.

The grouping loss computation section 153 then divides the result of the summation by the number of all class groups. The number of all class groups is expressed as g in Eq. 12.

Note that for example, the grouping loss may be obtained separately for the real features and the converted features. "real" means the grouping loss computed with reference to real feature values which do not go through the first rigid transformation section 121, the first relighting section 131, the second rigid transformation section 122 and the second relighting section 132. "converted" means the grouping loss computed with reference to converted feature values which are generated by the first rigid transformation section 121, the first relighting section 131, the second rigid transformation section 122 and the second relighting section 132 by taking real feature values as the input.

In other words, the grouping loss computation section 153 may compute a grouping loss for the real features based on features from a union of $X^S$ and $X^T$ (only involving real features). The grouping loss computation section 153 may compute another grouping loss for the converted features based on features from a union of $X'^S$ and $X'^T$ (only involving converted feature).

Alternatively, the grouping loss may be computed after undesired features are filtered out based on certain conditions. The conditions can depend on the correctness of the predictions given by the first class prediction section 141 and the second class prediction section 142, or on the confidence of the predictions given by the first class prediction section 141 and the second class prediction section 142.

(Conversion Loss Computation Section)

The conversion loss computation section 154 calculates a conversion loss with reference to the source domain feature values $X^S$, the converted source domain feature values $X'^S$, the target domain feature values $X^T$, and the converted target domain feature values $X'^T$.

The conversion loss computation section 154 may compute the conversion loss based on differences between the source domain feature values $X^S$ and the corresponding converted source domain feature values $X'^S$ and differences between the target domain feature values $X^T$ and the corresponding converted target domain feature values $X'^T$.

For example, the conversion loss computation section 154 calculates the conversion loss according to the following Equation.

[Math. 3]

$$\text{Loss\_classification} = \|x_{S1} - x_{S2'}\| + \|x_{S2} - x_{S1'}\| + \|x_{S3} - x_{S4'}\| + \|x_{S4} - x_{S3'}\| + \|x_{T1} - x_{T2'}\| + \|x_{T2} - x_{T1'}\| + \|x_{T3} - x_{T4'}\| + \|x_{T4} - x_{T3'}\| \quad \text{(Eq. 13)}$$

In Equation 13, $x_{S1}$, $x_{S2}$, $x_{S3}$, $x_{S4}$ are the source domain feature values, respectively. $x_{S1'}$, $x_{S2'}$, $x_{S3'}$, $x_{S4'}$ are the converted source domain feature values, respectively. $x_{S1}$ and $x_{S2'}$ are at the same view. $x_{S2}$ and $x_{S1'}$ are at the same view. $x_{S3}$ and $x_{S4'}$ are at the same view. $x_{S4}$ and $x_{S3'}$ are at the same view. $x_{T1}$, $x_{T2}$, $x_{T3}$, $x_{T4}$ are the target domain feature values, respectively. $x_{T1'}$, $x_{T2'}$, $x_{T3'}$, $x_{T4'}$ are the converted target domain feature values, respectively. $x_{T1}$ and $x_{T2'}$ are at the same view. $x_{T2}$ and $x_{T1'}$ are at the same view. $x_{T3}$ and $x_{T4'}$ are at the same view. $x_{T4}$ and $x_{T3'}$ are at the same view. In Eq. 13, the difference between feature values at the same view and the same domain are summed to compute the conversion loss (Loss_conversion).

(Merged Loss Computation Section)

The merged loss computation section 155 calculates a merged loss (Loss_merge) with reference to the source domain classification loss (Loss_classification_S), the target domain classification loss (Loss_classification_T), the grouping loss (Loss_grouping), and the conversion loss (Loss_conversion).

For example, the merged loss computation section 155 calculates a merged loss as follows.

$$\text{Loss\_merge} = \alpha\text{Loss\_classification\_S} + \beta\text{Loss\_classification\_T} + y\text{Loss\_grouping} + \delta\text{Loss\_conversion} \quad \text{(Eq. 14)}$$

In Equation 14, α, β, γ, and δ indicate weight coefficients. The weights may vary in accordance with the training progress. For example, at early training iterations, the weight of classification loss is high, and then the weight decays as the number of trained iterations increases. The weights may also be weights which require learning.

(Model Updating Section)

The model updating section 156 determines whether the merged loss is converged or not. When the merged loss is converged, the model updating section 156 outputs the model parameters to a storage medium. When the merged loss is not converged, the model updating section 156 updates model parameters for the first feature extraction section 111, the second feature extraction section 112, the first relighting section 131, the second relighting section 132, the first class prediction section 141, and the second class prediction section 142, with reference to the merged loss computed by the merged loss computation section 155.

For example, the model updating section 156 updates the model parameters such that the merged loss decreases. As an example, the model updating section 156 updates the model parameters according to a gradient back propagation method.

The model parameters updated by the model updating section 156 are supplied to the first feature extraction section 111, the second feature extraction section 112, the first relighting section 131, the second relighting section 132, the first class prediction section 141, and the second class prediction section 142.

(Technical Effects of the Present Example Embodiment)

In this example embodiment, the model updating section 156 updates the model parameters with reference to the grouping loss in addition to the source domain classification loss and the target domain classification loss and the conversion loss. Therefore, according to the third example embodiment, source domain features and target domain features preferably overlap each other, while features belonging to different classes are preferably separated for each class in a feature space.

Figure 7:
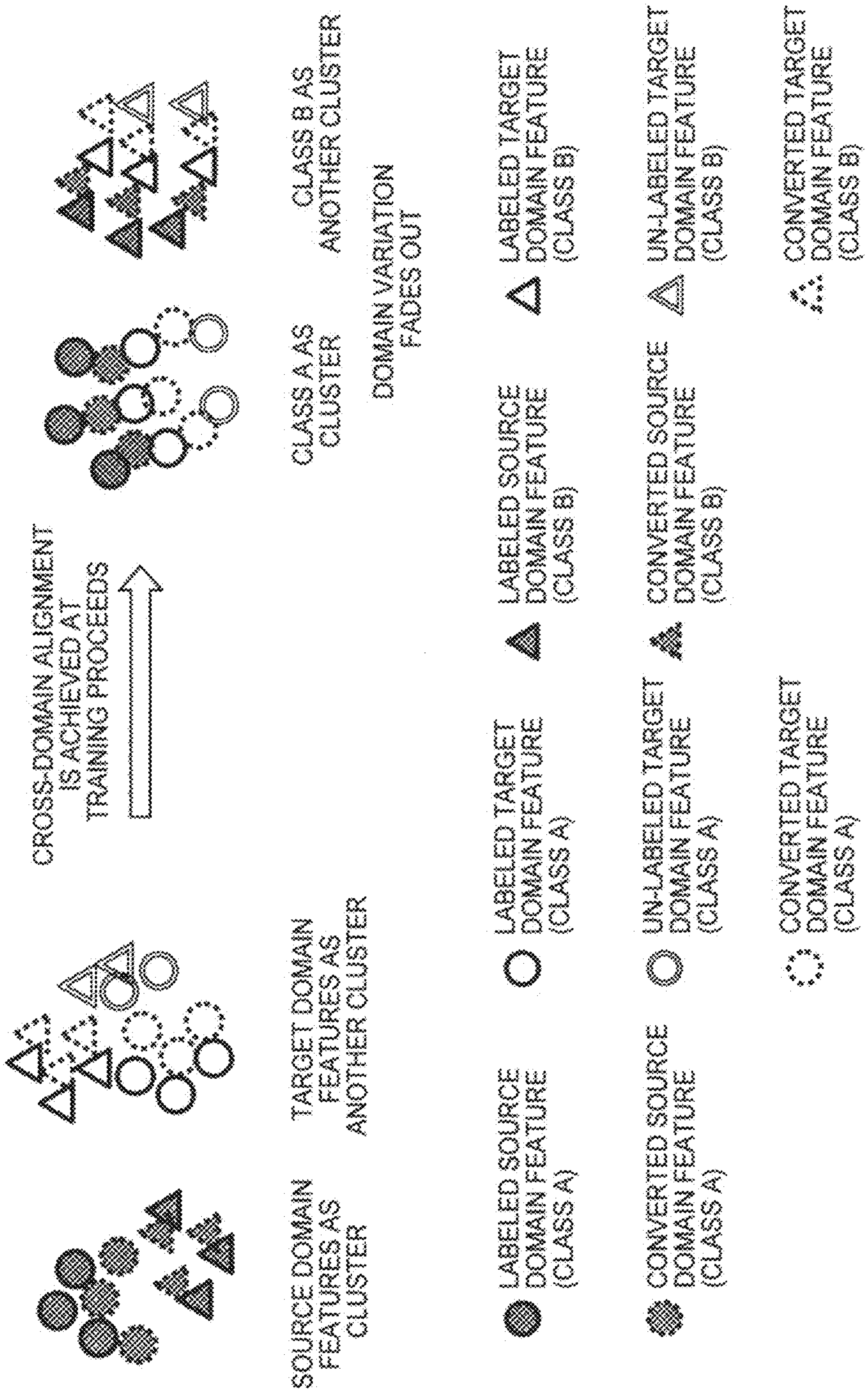
FIG. 7 is an explanatory diagram for explaining a cross domain alignment.

FIG. 7 schematically shows a cross domain alignment achieved in this example embodiment. In the training apparatus 103, since the grouping loss is included in the merged loss, as the training proceeds, source domain features and target domain features preferably overlap each other, while features belonging to different classes are preferably separated for each class in a feature space, as shown in FIG. 7. In other words, in this example embodiment, a cross domain alignment in a feature space is appropriately achieved.

As a result, the second feature extraction section 112 and the second class prediction section 142 are appropriately trained even in a case where a small amount of target domain labeled data is available.

Further, the first rigid transformation section 121 modifies the source domain feature values $X^S$ according to the structural conversion parameters $\Theta^S$. Then, the first relighting section 131 generates the converted source domain feature values $X'^S$, based on transformed source domain structural features generated by the first rigid transformation section 121. The second rigid transformation section 122 modifies the target domain features values $X^T$ according to the structural conversion parameters $\Theta^T$. Then, the second relighting section 132 generates the converted target domain feature values $X'^T$, based on transformed target domain structural features generated by the second rigid transformation section 122.

The first relighting section 131 can obtain structural features which appear as if they are extracted from an image at another view indicated by the structural conversion parameters, based on the structural features in one view. The second relighting section 132 can obtain structural features which appear as if they are extracted from an image at another view indicated by the structural conversion parameters, based on the structural features in one view.

Therefore, the first class prediction section 141 and the second class prediction section 142 can be trained such that the first class prediction section 141 and the second class prediction section 142 can provide appropriate class predictions for various shooting angles.

(Operation of Training Apparatus)

Figure 8:
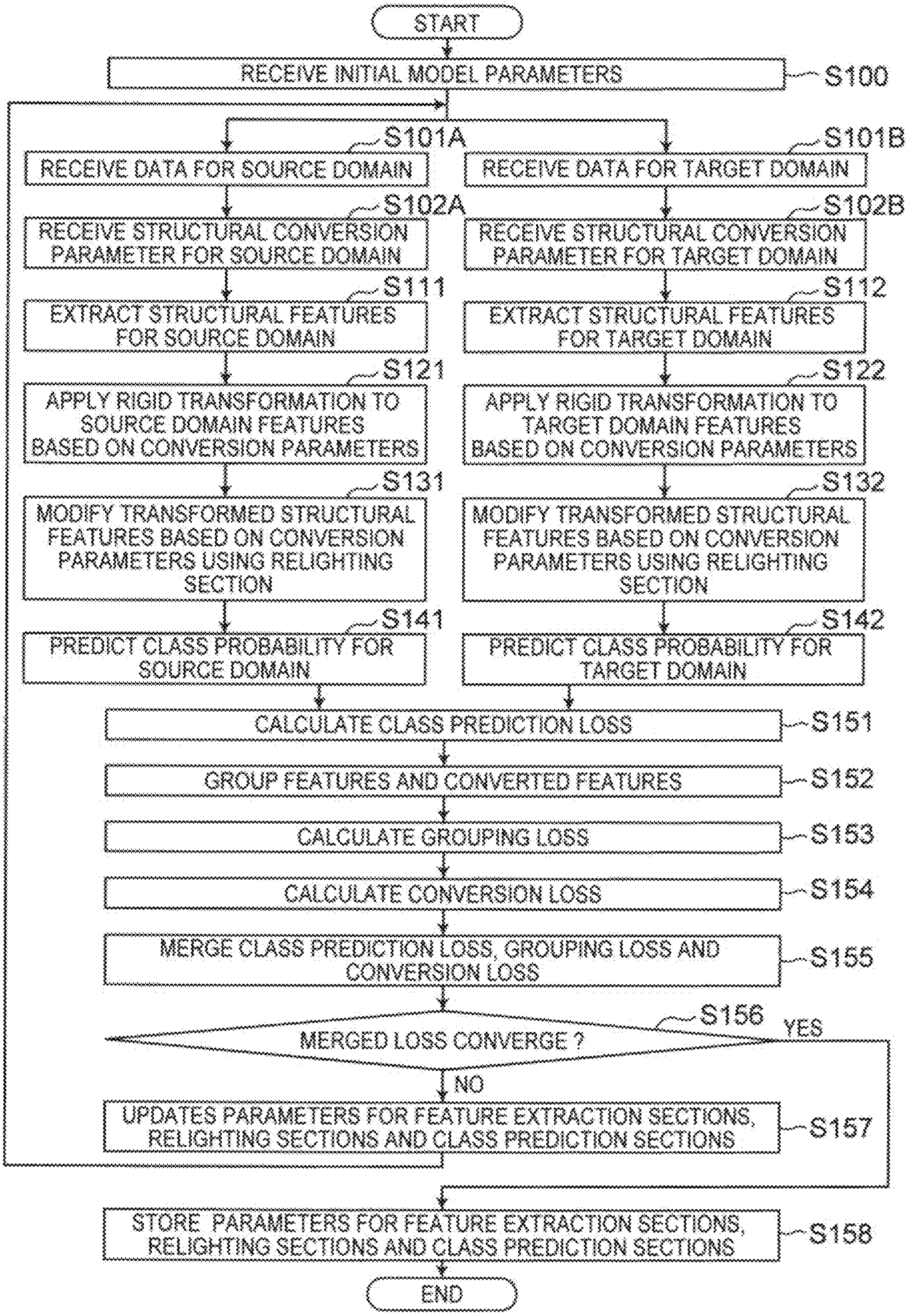
FIG. 8 is a flowchart showing an operation of the training device of the third example embodiment.

Next, the operation of the training device 103 will be explained with reference to the flowchart in FIG. 8.

The training apparatus 103 receives initial model parameters (step S100). The initial model parameters include initial model parameters for the first feature extraction section 111, the second feature extraction section 112, the first relighting section 131, the second relighting section 132, the first class prediction section 141, and the second class prediction section 142. The received initial model parameters are supplied to the first feature extraction section 111, the second feature extraction section 112, the first relighting section 131, the second relighting section 132, the first class prediction section 141, and the second class prediction section 142.

The training apparatus 103 receives input source domain data. That is, the training apparatus 103 receives the source domain image data $I^S$ and the source domain class label data $Y^S$ associated with the image data $I^S$ (step S101A).

The first rigid transformation section 121 receives the source domain structural conversion parameters $\Theta^S$ (step S102A).

The first feature extraction section 111 extracts the structural features for the source domain (source domain feature values) $X^S$ from the source domain image data $I^S$ (step S111).

The first rigid transformation section 121 applies rigid transformation to the source domain feature values $X^S$, based on the structural conversion parameters OS (step S121). The first relighting section 131 modifies the transformed structural features inputted from the first rigid transformation section 121, based on the structural conversion parameters OS (step S131).

The first class prediction section 141 predicts the source domain class prediction values (probability) $P^S$ (step S141).

The training apparatus 103 receives input target domain data. That is, the training apparatus 103 receives the target domain image data $I^T$ and the target domain class label data $Y^T$ associated with the image data $I^T$ (step S101B).

The second rigid transformation section 122 receives the target domain structural conversion parameters $\Theta^T$ (step S102B).

The second feature extraction section 112 extracts the structural features for the target domain (target domain feature values) $X^T$ from the target domain image data $I^T$ (step S112).

The second rigid transformation section 122 applies rigid transformation to the target domain feature values $X^T$, based on the structural conversion parameters $\Theta^T$ (step S122). The second relighting section 132 modifies the transformed structural features inputted from the second rigid transformation section 122, based on the structural conversion parameters $\Theta^T$ (step S132).

The second class prediction section 142 predicts the target domain class prediction values probability) $P^T$ (step S142).

The classification loss computation section 151 calculates a source domain classification loss (Loss_classification_S) with reference to the source domain class prediction values $P^S$, the source domain class prediction values of the converted source domain feature values $CP^S$ and source domain class label data $Y^S$ (step S151). The classification loss computation section 151 also calculates a target domain classification loss (Loss_classification_T) with reference to the target domain class prediction values $P^T$, the target domain class prediction values of the converted target domain feature values $CP^T$ and target domain class label data $Y^T$ (step S151).

The grouping section 152 generates and outputs, from the source domain structural features (source domain feature values) $X^S$, the converted source domain feature values $X'^S$, the target domain structural features (target domain feature values) $X^T$, and the converted target domain feature values $X'^T$, class groups where each class group contains feature values sharing the same class label (step S152).

The grouping loss computation section 153 calculates the grouping loss (Loss_grouping) with reference to the class groups generated by the grouping section 152 (step S153). The conversion loss computation section 154 calculates a conversion loss with reference to the source domain feature values $X^S$, the converted source domain feature values $X'^S$, the target domain feature values $X^T$, and the converted target domain feature values $X'^T$ (step S154).

The merged loss computation section 155 calculates a merged loss (Loss_merge) with reference to the source domain classification loss (Loss_classification_S), the target domain classification loss (Loss_classification_T), the grouping loss (Loss_grouping), and the conversion loss (Loss_conversion) (step S155). The merged loss computation section 155 calculates a merged loss using Equation 14, for example.

The model updating section 156 determines whether the merged loss is converged or not. When the merged loss is converged (Yes in the step S156), the process proceeds to the step S158. When the merged loss is not converged (No in the step S156), the process proceeds to the step S157. For example, the model updating section 156 compares the merged loss with a predetermined threshold to determine whether the merged loss is converged or not.

The model updating section 156 updates model parameters for the first feature extraction section 111, the second feature extraction section 112, the first relighting section 131, the second relighting section 132, the first class prediction section 141, and the second class prediction section 142, with reference to the merged loss computed by the merged loss computation section 155 (step S157).

The model updating section 156 stores, in a storage medium (not shown in FIG. 5), the model parameters for the first feature extraction section 111, the second feature extraction section 112, the first relighting section 131, the second relighting section 132, the first class prediction section 141, and the second class prediction section 142.

Note that the order in which the steps of S151, S152 and S153, and S154 is optional. They can be carried out in any order. In addition, the steps of S151, S152 and S153, and S154 may be executed simultaneously.

Example Embodiment 4

(Configuration of Training Apparatus)

Figure 9:
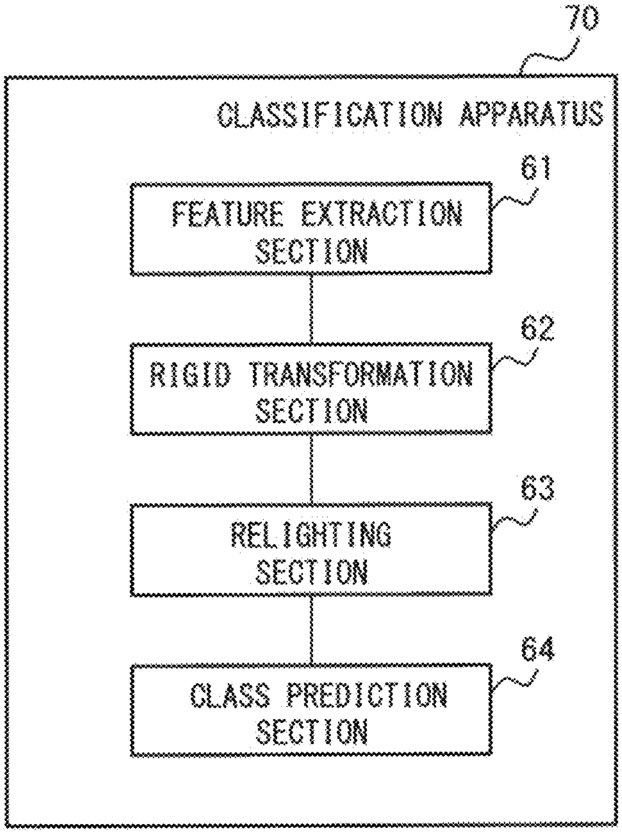
FIG. 9 is a block diagram showing a configuration example of a classification apparatus of the fourth example embodiment.

FIG. 9 is a block diagram showing a configuration example of a classification apparatus of the fourth example embodiment.

The classification apparatus 70 shown in FIG. 9 comprises a feature extraction section 61, a rigid transformation section 62, a relighting section 63, and a class prediction section 64. The feature extraction section 61 and the class prediction section 64 are the same as those in the second example embodiment.

The rigid transformation section 62 is configured in a manner similar to that of the above described second rigid transformation section 122. The relighting section 63 is configured in a manner similar to that of the above described second relighting section 132.

The rigid transformation section 62 operates in the same way as the second rigid transformation section 122. Thus, the rigid transformation section 62 applies rigid transformation to the target domain features values $X^T$. The relighting section 63 operates in the same way as the second relighting section 132. Thus, the relighting section 63 modifies the transformed structural features inputted from the rigid transformation section 62.

(Technical Effects of the Present Example Embodiment)

In this example embodiment, the classification apparatus 70 provides a preferable classification process for input images having various shooting angles, even in a case where training images having a limited variation of shooting angles, for example, are available.

Example Embodiment 5

(Configuration of training apparatus)

Figure 10:
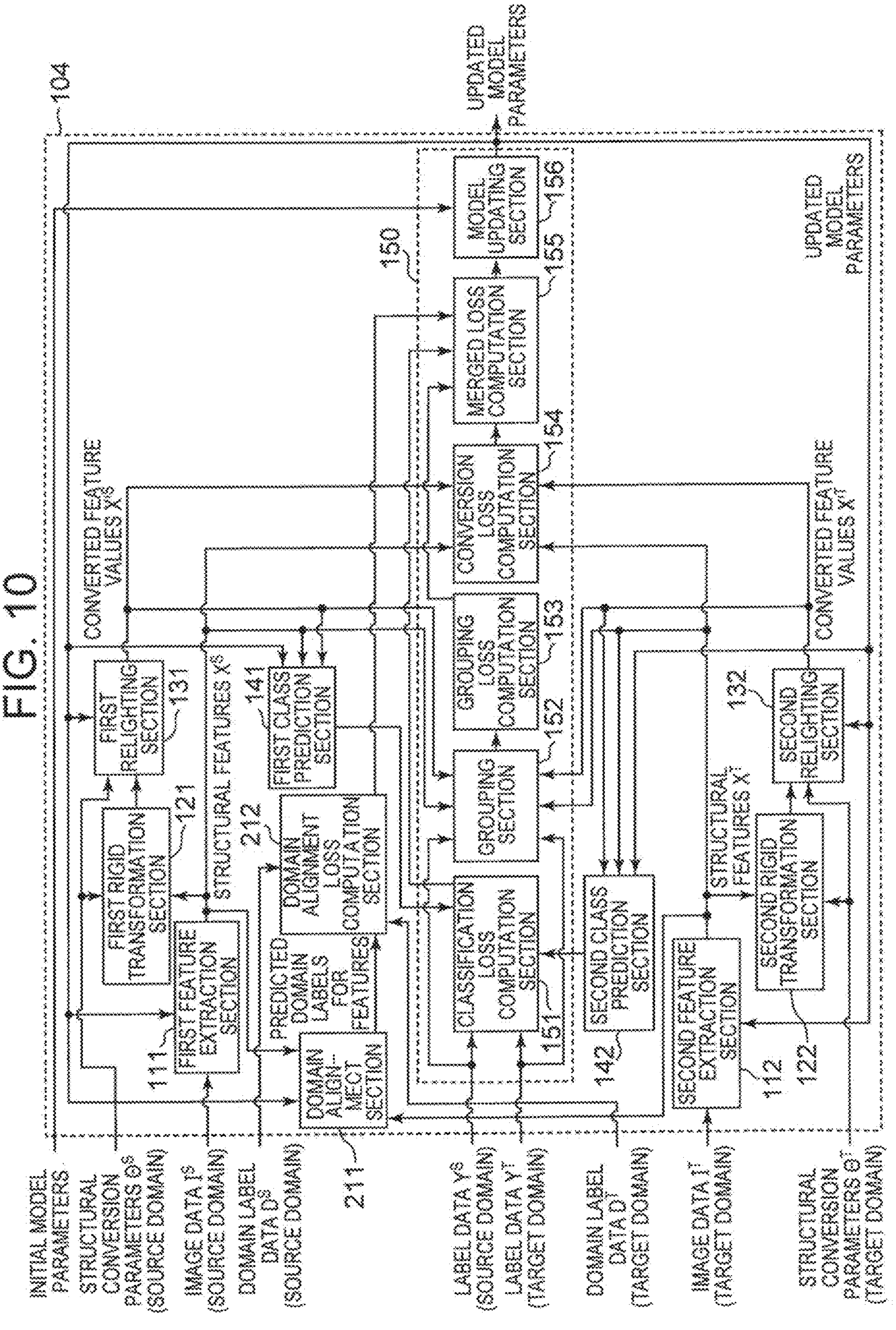
FIG. 10 is a block diagram showing a configuration example of a training apparatus of the fifth example embodiment.

FIG. 10 is a block diagram showing a configuration example of a training apparatus of the fifth example embodiment. The training apparatus 104 comprises the training apparatus 103 of the third embodiment shown in FIG. 5, with the addition of a domain alignment section 211 and a domain alignment loss computation section 212. However, in this example embodiment, the merged loss computation section 155 also merges a domain alignment loss. Various options are available for the domain alignment. The domain alignment section 211 can be implemented to select kernels for computing the Maximum Mean Discrepancy (MMD) between the source domain and the target domain, and the domain alignment loss computation section 212 computes the MMD as the loss. Another example is to implement the domain alignment section 211 as a domain discrimination section, and the domain alignment loss computation section 212 as a domain confusion loss computation section. Here, an example of the latter implementation is explained as follows.

The domain alignment section 211 carries out a domain alignment process to align the target domain with the source domain. For example, the domain alignment section 211 can be a convolutional neural network (CNN), can be a recurrent neural network (RNN), or can be any of other neural networks or feature extractors. However, a specific configuration of the domain alignment section 211 does not limit the present example embodiment and example embodiments below.

For example, the domain alignment section 211 as the domain discrimination section carries out domain prediction which indicates whether a feature is from the source domain or from the target domain. The domain alignment section 211 receives the source domain feature values $X^S$ extracted by the first feature extraction section 111 and the target domain feature values $X^T$ extracted by the second feature extraction section 112. Then, the domain alignment section 211 carries out a discrimination process to discriminate the source domain feature values $X^S$ from the target domain feature values $X^T$ without referring to any other information regarding which domain the feature belongs to. For example, in the discrimination process, the domain alignment section 211 calculates the probability that the feature comes from the source domain, calculates another probability that the feature comes from the target domain, assigns the domain label of the higher probability as the predicted domain label of that feature, for each feature. Then, the domain alignment section 211 outputs a result of the discrimination process. However, it is also possible for the converted features to participate in the discrimination process.

The discrimination result for the source domain feature $X^S$ is $DP^S$. The discrimination result for the target domain feature $X^T$ is $DP^T$.

The domain alignment loss computation section 212 calculates a domain alignment loss according to a distance between the source domain and the target domain (for example, MMD). When the domain alignment loss computation section 212 behaves as the domain confusion loss computation section, the domain alignment loss computation section 212 can also calculate a domain alignment loss according to a degree of mismatch between $DP^S$ and the source domain domain label data $D^S$, and a degree of mismatch between $DP^T$ and the target domain domain label data $D^T$. The degree of mismatch can be calculated using a binary cross-entropy loss function, for example. The domain alignment loss computation section 212, for example, takes a sum of both degree of mismatch as the domain alignment loss.

In this example embodiment, the merged loss computation section 155 calculates the domain alignment loss as follows.

$$\text{Loss\_merge} = \alpha\text{Loss\_classification\_S} + \beta\text{Loss\_classification\_T} + y\text{Loss\_grouping} + \delta\text{Loss\_conversion} \cdot \tau\text{Loss\_domain\_alignment} \quad \text{(Eq. 15)}$$

In Equation 15, Loss_domain_alignment indicates the domain alignment loss, and t is a weight coefficient. Note that the sign in front of the domain alignment loss is minus. This means that the model updating section 156 updates the model parameters for the first feature extraction section 111 and the second feature extraction section 112 such that the extracted features may cause a discrimination result by the domain discrimination section 211 to become less accurate. In other words, the model updating section 156 updates the model parameters for the first feature extraction section 111 and the second feature extraction section 112 such that the extracted features may confuse the domain alignment section 211.

When performing training, the training apparatus 104 carries out the following processes. First, the training apparatus 104 trains the domain alignment section 211 so that the domain alignment section 211 can tell whether a feature is from a source domain or from a target domain. Next, the training apparatus 104 trains the first feature extraction section 111 and the second feature extraction section 112 to extract features that can confuse the trained domain alignment section 211. The training apparatus repeats the above processes.

In this example embodiment, the domain gap between the source and the target domains are further minimized. Thus, the structural knowledge can be more accurately transferred from the source domain to the target domain.

(Operation of Training Apparatus)

Figure 11:
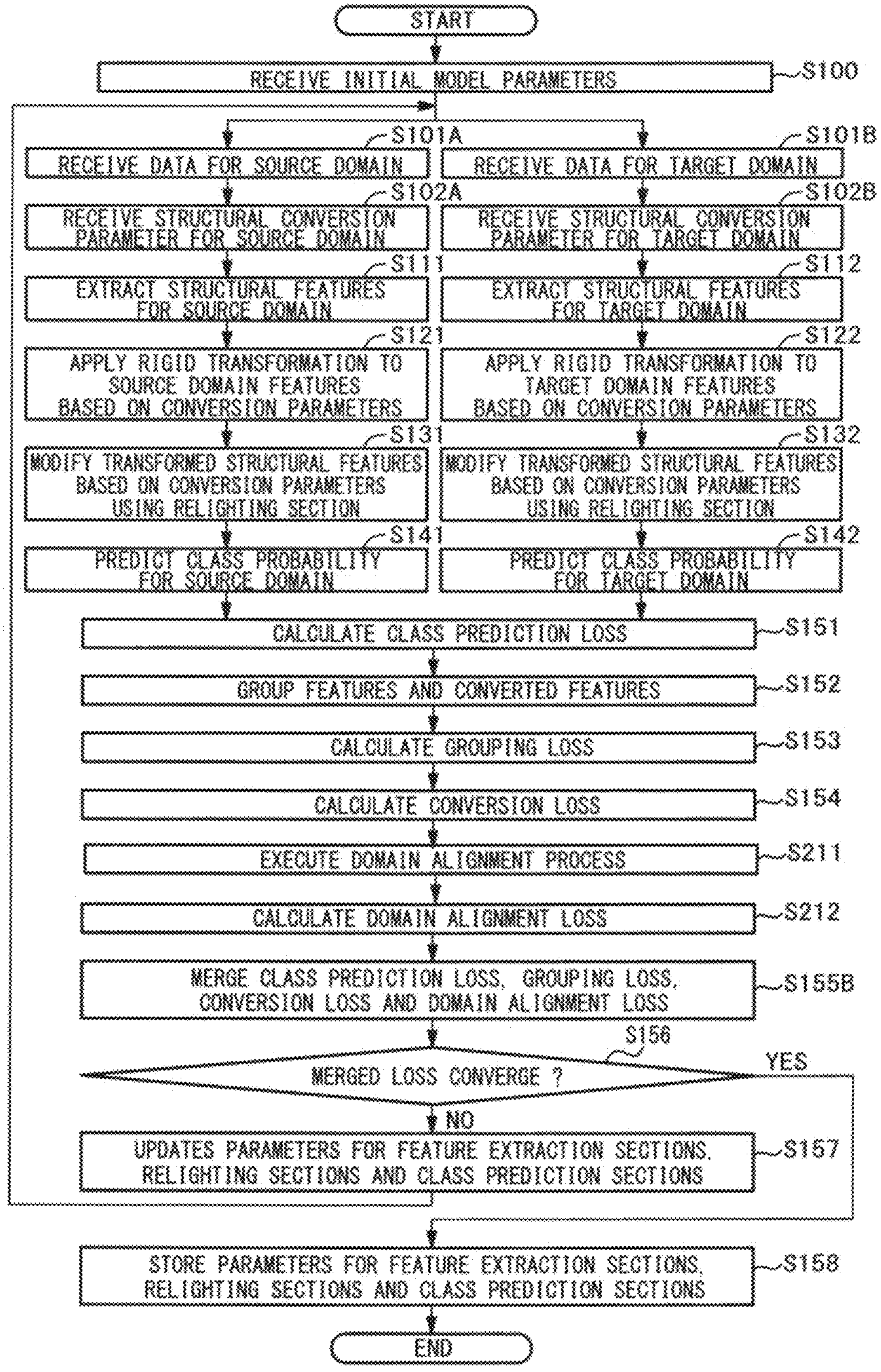
FIG. 11 is a flowchart showing an operation of the training device of the fifth example embodiment.

Next, the operation of the training device 104 will be explained with reference to the flowchart in FIG. 11. The operation of steps S100 to S154 and S156 to 158 is the same as it of the training device 103 shown in FIG. 8.

In this example embodiment, in step S211, the trained domain discrimination section 211 executes the above mentioned domain alignment process including the discrimination process. The domain alignment loss computation section 212 calculates the domain alignment loss, based on the result of the alignment process by the domain alignment section 211 in step S212.

In step S155B, the merged loss computation section 155 calculates a merged loss (Loss_merge) with reference to the source domain classification loss (Loss_classification_S), the target domain classification loss (Loss_classification_T), the grouping loss (Loss_grouping), the conversion loss (Loss_conversion), and the domain alignment loss (Loss_domain_alignment). The merged loss computation section 155 calculates a merged loss using Equation 15, for example.

(Technical Effects of the Present Example Embodiment)

By introducing the "domain confusion" technique, the training apparatus 104 can reduce the domain gap between the source, the target and the converted target domain which consists of the converted target domain features generated from target domain features.

Example Embodiment 6

(Configuration of Training Apparatus)

Figure 12:
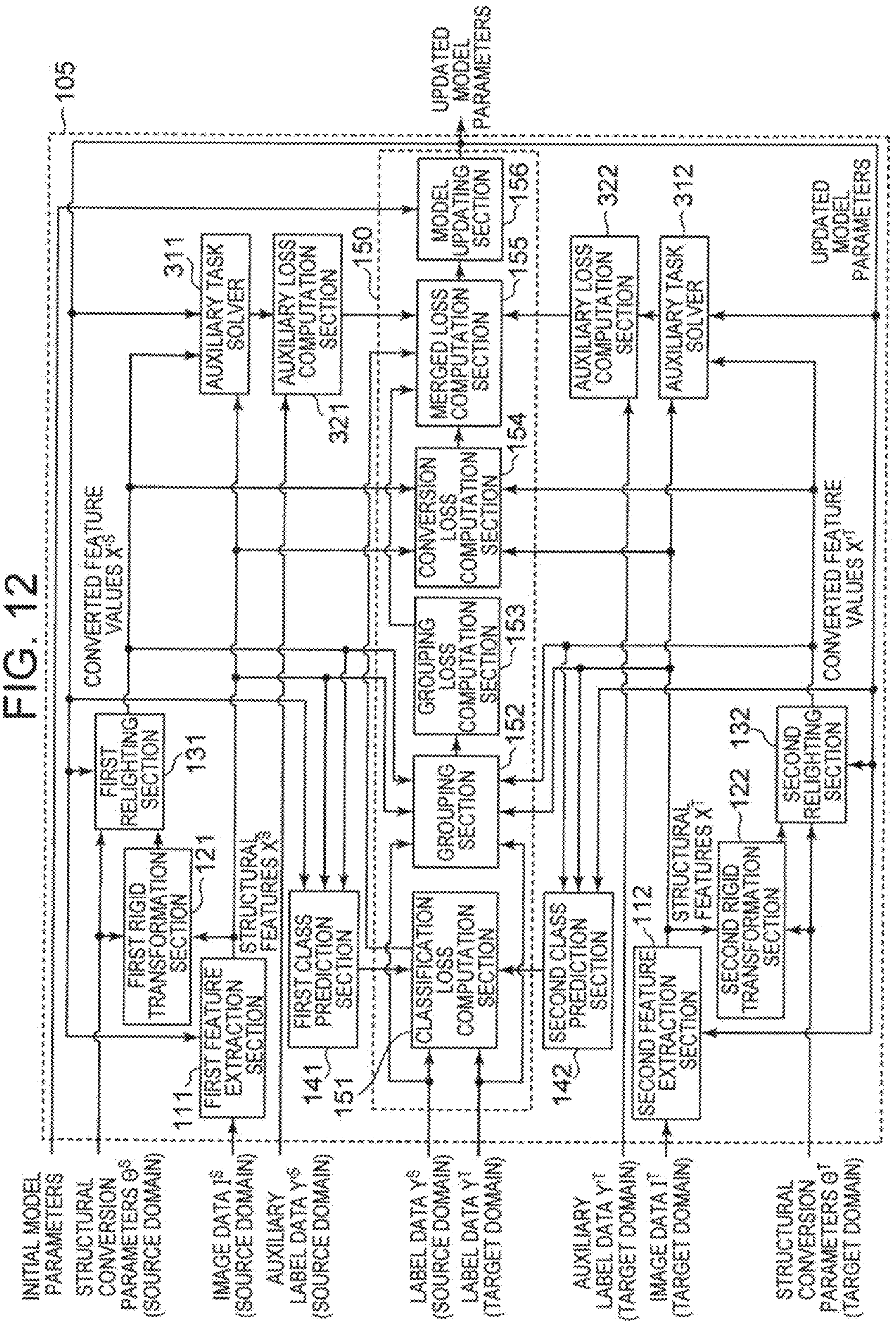
FIG. 12 is a block diagram showing a configuration example of a training apparatus of the sixth example embodiment.

FIG. 12 is a block diagram showing a configuration example of a training apparatus of the sixth example embodiment. The training apparatus 105 comprises the training apparatus 103 of the third embodiment shown in FIG. 5, with the addition of an auxiliary task solver (first auxiliary task solver) 311, an auxiliary task solver (second auxiliary task solver) 312, an auxiliary loss computation section (first auxiliary loss computation section) 321 and an auxiliary loss computation section (second auxiliary loss computation section) 322. However, in this example embodiment, the merged loss computation section 155 also merges an auxiliary loss.

In machine learning, since the quality of the features extracted from images largely affects the performance of mode, it is to be desired that not only the ultimate classification goal but also some secondary goal is satisfied for extracting features of higher quality.

In this example embodiment, an auxiliary task is introduced for satisfying a secondary goal. The auxiliary task solvers 311, 312 solve the auxiliary task. Various options are available for the auxiliary task.

(First Option)

In the first option, an image reconstruction task is assumed to be an auxiliary task where given a feature extracted from an image, the original image can be recovered from that feature. The auxiliary task solver can be realized by a decoding neural network that takes a feature as input and outputs an image reconstructed from that feature. The auxiliary loss computation sections 321, 322 calculate the pixel-wise intensity difference between the input image and the reconstructed image. When the loss is minimized, the reconstructed image is almost the same as the input image. This means the feature extracted from an image is a good compression of the original image with only little information being lost.

Specifically, as shown FIG. 12, the source domain feature values $X^S$ are inputted to the auxiliary task solver 311 from the first feature extraction section 111. The converted source domain structural features $X'^S$ are inputted to the auxiliary task solver 311 from the first relighting section 131.

The auxiliary task solver 311 generates reconstructed images from the source domain feature values $X^S$ and the converted source domain structural features $X'^S$ with reference to the input image data (source domain image data) $I^S$. For example, the auxiliary task solver 311 generates two reconstructed images from the source domain feature $x_{S1}$ from the first feature extraction section 111 and the converted source domain feature $x_{S2'}$ from the first relighting section 131. The two reconstructed images generated from the auxiliary task solver 311 are very similar to the image from which the source domain feature $x_{S1}$ has been extracted. Note that the feature $x_{S1}$ and $x_{S2'}$ are at the same view.

An auxiliary label data $Y'^S$ is inputted to the auxiliary loss computation section 321. The auxiliary label data $Y'^S$ is used to compute the auxiliary loss. In this option, the auxiliary label data $Y'^S$ is the input image. The auxiliary loss computation section 321 calculates differences between the source domain reconstructed images and the auxiliary label data to obtain a source domain reconstruction loss (Loss_reconstruction_S) as the auxiliary loss.

As shown FIG. 12, the target domain feature values $X^T$ are inputted to the auxiliary task solver 312 from the second feature extraction section 112. The converted target domain structural features $X'^T$ are inputted to the auxiliary task solver 312 from the second relighting section 132.

The auxiliary task solver 312 generates reconstructed images from the target domain feature values $X^T$ and the converted target domain structural features $X'^T$ with reference to the input image data (target domain image data) $I^T$. For example, the auxiliary task solver 312 generates two reconstructed images from the target domain feature $x_{T1}$ from the second feature extraction section 112 and the converted target domain feature $x_{T2'}$ from the second relighting section 132. The two reconstructed images generated from the auxiliary task solver 312 are very similar to the image from which the target domain feature $x_{T1}$ has been extracted. Note that the feature $x_{T1}$ and $x_{T2'}$ are at the same view.

An auxiliary label data $Y'^T$ is inputted to the auxiliary loss computation section 322. The auxiliary label data $Y'^T$ is used to compute the auxiliary loss. In this option, the auxiliary label data $Y'^T$ is the input image. The auxiliary loss computation section 322 calculates differences between the target domain reconstructed images and the auxiliary label data to obtain a target domain reconstruction loss (Loss_reconstruction_T) as the auxiliary loss.

In this option, the merged loss computation section 155 calculates the auxiliary loss as follows. In Equation 16, n and ξ are weight coefficients.

$$\text{Loss\_merge} = \alpha\ \text{Loss\_classification\_S} + \beta\text{Loss\_classification\_T} + y\text{Loss\_grouping} + \delta\ \text{Loss\_conversion} + \eta\text{Loss\_reconstruction\_S} + \xi\text{Loss\_recontruction\_T} \quad \text{(Eq. 16)}$$

(Second Option)

In the second option, an angle estimation task where given a feature extracted from an image, the angle of that image can be estimated from the feature is assumed to be an auxiliary task. The auxiliary task solver can be realized by an angle estimation neural network which takes a feature as input and outputs an angle value within [−π, π] (i.e. [−180 degree, 180 degree]).

Specifically, as shown in FIG. 12, the source domain feature values $X^S$ are inputted to the auxiliary task solver 311 from the first feature extraction section 111. The converted source domain structural features $X'^S$ are inputted to the auxiliary task solver 311 from the first relighting section 131.

The auxiliary task solver 311 predicts source domain angle prediction values from the source domain feature values $X^S$ and the converted source domain feature values $X'^S$.

An auxiliary label data $Y'^S$ is inputted to the auxiliary loss computation section 321. The auxiliary label data $Y'^S$ is used to compute the auxiliary loss. In this option, the auxiliary label data $Y'^S$ is the true angle of each input image. The auxiliary loss computation section 321 calculates differences between the estimated angles and the true angles to obtain a source domain angle prediction loss (Loss_angle_prediction_S) as the auxiliary loss.

When the auxiliary loss (angle prediction loss) is minimized, the estimated angle is almost the same as the true angle of the input image. This means the feature extracted from an image holds a cue of the angle in addition to the cue of the class of the input image. This more informative feature can ease the classification task (which is the ultimate goal) and improve the classification accuracy.

As shown FIG. 12, the target domain feature values $X^T$ are inputted to the auxiliary task solver 312 from the second feature extraction section 112. The converted target domain structural features $X'^T$ are inputted to the auxiliary task solver 312 from the second relighting section 131.

The auxiliary task solver 312 predicts target domain angle prediction values from the target domain feature values $X^T$ and the converted target domain feature values $X'^T$.

An auxiliary label data $Y'^T$ is inputted to the auxiliary loss computation section 322. The auxiliary label data $Y'^T$ is used to compute the auxiliary loss. In this option, the auxiliary label data $Y'^T$ is the true angle of each input image. The auxiliary loss computation section 322 calculates differences between the estimated angles and the true angles to obtain a target domain angle prediction loss (Loss_angle_prediction_T) as the auxiliary loss.

In this option, the merged loss computation section 155 calculates the auxiliary loss as follows. In Equation 17, η' and ξ' are weight coefficients.

$$\text{Loss\_merge} = \alpha\ \text{Loss\_classification\_S} + \beta\text{Loss\_classification\_T} + \text{yLoss\_grouping} + \delta\ \text{Loss\_conversion} + \eta'\text{Loss\_angle\_prediction\_S} + \xi'\text{Loss\_angle\_prediction\_T} \quad \text{(Eq. 17)}$$

(Third Option)

In the third option, a conversion confusion task where given a converted domain and a non-converted domain, the domain gap is minimized is assumed to be an auxiliary task.

The concept of "conversion confusion" in this option is almost the same as "domain confusion" in the fifth example embodiment above. "Conversion confusion" means that the "conversion discrimination module" is supposed to be very good at distinguishing the features from the converted domain and from the non-converted domain. Here, the converted domain consists of converted features from the source domain and the target domain, and the non-converted domain consists of features from the source domain and the target domain that have not gone through conversion. However, in this option, a "feature extraction module" is learned intentionally. The feature extraction module extracts features that are so mixed-up that even a powerful "conversion discrimination module" cannot tell whether the features are from the converted domain or from the non-converted domain. In this way, the domain gap between the converted domain and the non-converted domain is minimized.

Specifically, as shown FIG. 12, the source domain feature values $X^S$ are inputted to the auxiliary task solver 311 from the first feature extraction section 111. The converted source domain structural features $X'^S$ are inputted to the auxiliary task solver 311 from the first relighting section 131.

The auxiliary task solver 311 makes a decision on whether the source domain feature values $X^S$ are converted or not. Specifically, the auxiliary task solver 311 calculates the probability that the feature has been converted by the first rigid transformation section 121 and the first relighting section 131, for each feature.

An auxiliary label data $Y'^S$ is inputted to the auxiliary loss computation section 321. The auxiliary label data $Y'^S$ is used to compute the auxiliary loss. In this option, the auxiliary label data $Y'^S$ is either "converted domain" or "non-converted domain" for each feature as ground truth conversion label data. The auxiliary loss computation section 321 calculates the correspondence between the predicted conversion labels and the ground truth conversion labels to obtain a conversion confusion loss (Loss_conversion_confusion_S) as the auxiliary loss. The domain gap between the converted domain and the non-converted domain can be minimized, by optimizing the conversion confusion loss.

Note that the auxiliary loss (conversion confusion loss) is the correctness of the conversion predictions. For example, predicted values are ["non-converted", "converted"] and the ground truth labels are also ["non-converted", "converted"]. Thus, the auxiliary loss=1 (accuracy=100%). However, it is desired to minimize this loss. That means it is desired that the predictions to be wrong.

As shown FIG. 12, the target domain feature values $X^T$ are inputted to the auxiliary task solver 312 from the second feature extraction section 112. The converted target domain structural features $X^T$ are inputted to the auxiliary task solver 312 from the second relighting section 132.

The auxiliary task solver 312 makes a decision on whether the target domain feature values $X^T$ are converted or not. Specifically, the auxiliary task solver 312 calculates the probability that the feature has been converted by the second rigid transformation section 122 and the second relighting section 132, for each feature.

An auxiliary label data $Y^T$ is inputted to the auxiliary loss computation section 322. The auxiliary label data $Y'^T$ is used to compute the auxiliary loss. In this option, the auxiliary label data $Y'^T$ is either "converted domain" or "non-converted domain" for each feature as ground truth conversion label data. The auxiliary loss computation section 322 calculates the correspondence between the predicted conversion labels and the ground truth conversion labels to obtain a conversion confusion loss (Loss_conversion_confusion_T) as the auxiliary loss.

In this option, the merged loss computation section 155 calculates the conversion loss as follows. In Equation 18, η" and ξ' are weight coefficients.

$$\text{Loss\_merge} = \alpha\ \text{Loss\_classification\_S} + \beta\text{Loss\_classification\_T} + \text{yLoss\_grouping} + \delta\ \text{Loss\_conversion} + \eta''\text{Loss\_conversion\_confusion\_S} + \xi'\text{Loss\_conversion\_T} \quad \text{(Eq. 18)}$$

According to the options 1 to 3, since not only the ultimate classification goal but also some secondary goal is satisfied, features of higher quality can be extracted.

(Operation of Training Apparatus)

Figure 13:
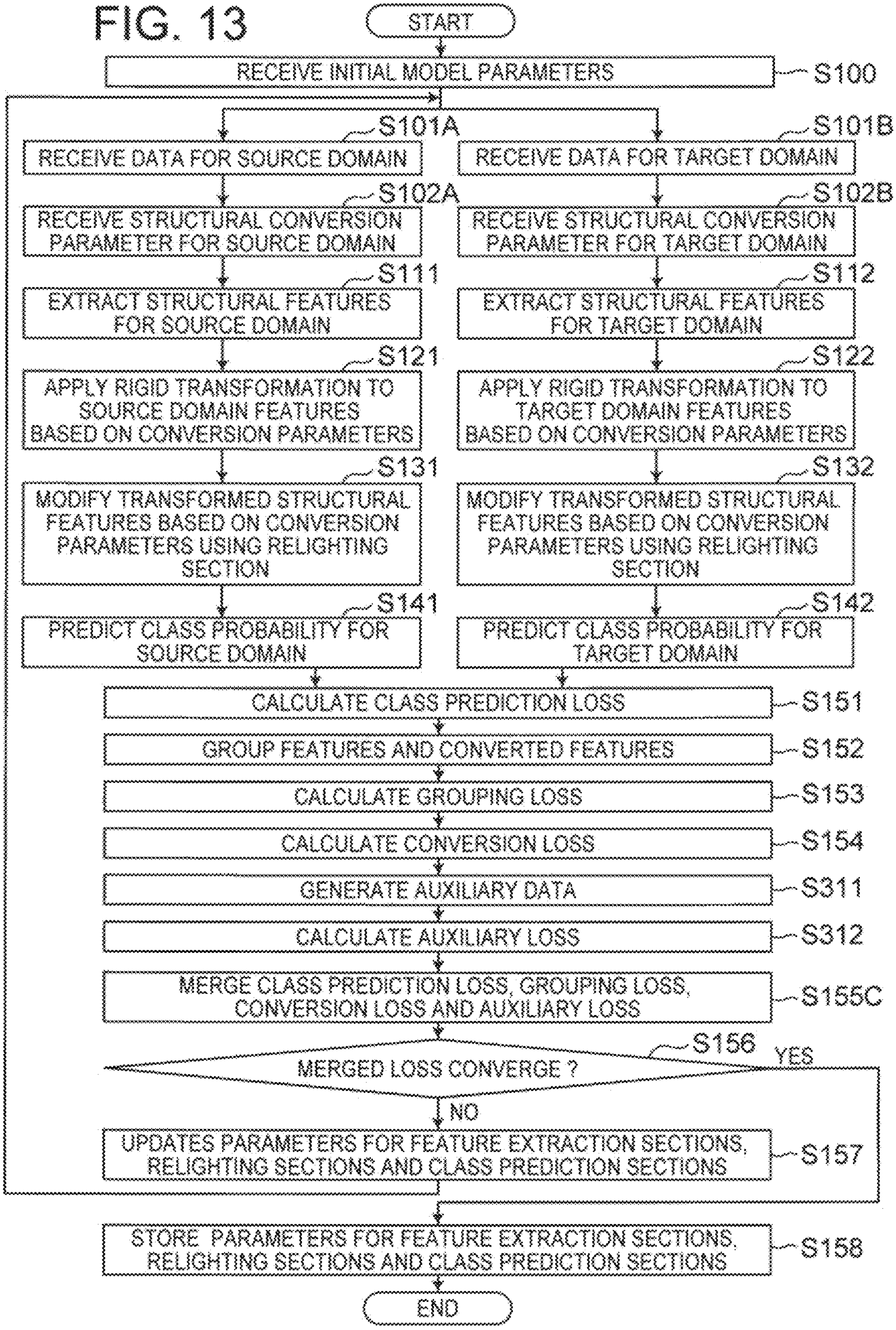
FIG. 13 is a flowchart showing an operation of the training device of the sixth example embodiment.

Next, the operation of the training device 105 will be explained with reference to the flowchart in FIG. 13. The operation of steps S100 to S154 and S156 to 158 is the same as it of the training device 103 shown in FIG. 8. The operation shown in FIG. 13 is mainly for the case where the option 1 and the option 2 above is focused on.

In step S311, the auxiliary task solvers 311,312 generate auxiliary data. In the option 1, the auxiliary data are reconstructed images. In the option 2, the auxiliary data are angle prediction values.

In step S312, the auxiliary loss computation sections 321,322 calculate auxiliary losses. In the option 1, the auxiliary losses are the source domain reconstruction loss and the target domain reconstruction loss. In the option 2, the auxiliary losses are the source domain angle prediction loss and the target domain angle prediction loss.

Note that in the option 3, the auxiliary task solvers 311,312 make a decision on whether the source domain feature values $X^S$ and the target domain feature values $X^T$ are converted or not in step S311. The auxiliary loss computation sections 321,322 calculate conversion confusion losses.

In step S155C, the merged loss computation section 155 calculates a merged loss (Loss_merge) with reference to the source domain classification loss (Loss_classification_S), the target domain classification loss (Loss_classification_T), the grouping loss (Loss_grouping), the conversion loss (Loss_conversion), and the auxiliary loss. The merged loss computation section 155 calculates a merged loss using Equation 16, 17 or 18, for example.

Example Embodiment 7

(Configuration of Training Apparatus)

Figure 14:
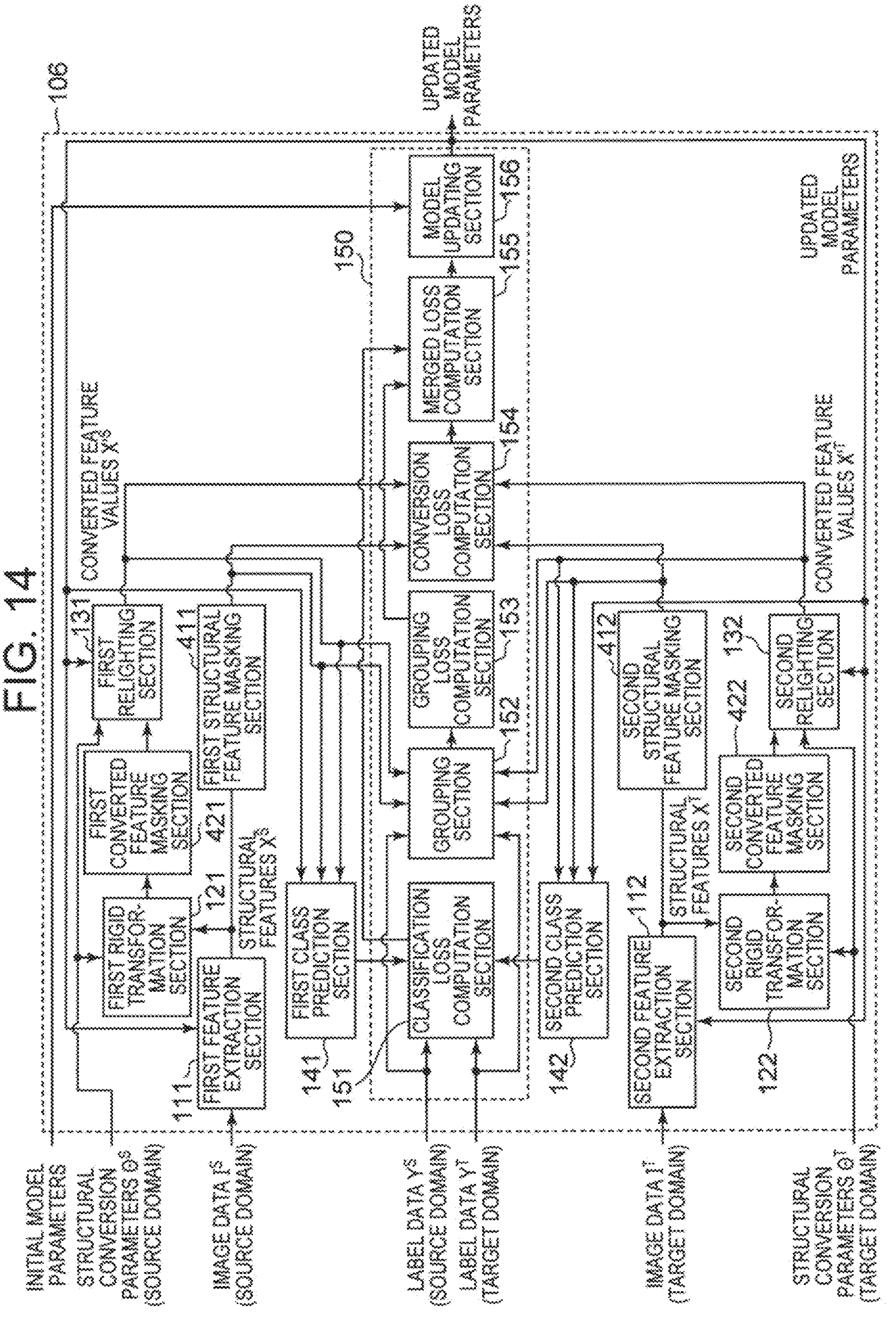
FIG. 14 is a block diagram showing a configuration example of a training apparatus of the seventh example embodiment.

FIG. 14 is a block diagram showing a configuration example of a training apparatus of the seventh example embodiment. The training apparatus 106 comprises the training apparatus 103 of the third embodiment shown in FIG. 5, with the addition of a first structural feature masking section 411, a first converted feature masking section 421, a second structural feature masking section 412, a second converted feature masking section 422.

This example embodiment assumes that structural features are represented by a feature map rather than point coordinates. When the structural features are designed as a feature map instead of coordinates of points, after rigid transformation, some information at the boundary is lost. Thus, to make the feature maps before and after transformation comparable, masking to drop the information at the boundary is added. This can improve performance of classification.

If rigid transforming is performed without masking, after transformation, there is missing information at the boundary of the maps. Thus, when the maps for the structural features not going through transformation (non-transformed feature) are directly compared with the maps for transformed features, these missing region would always make the pixel-wise difference large. By applying a mask to both transformed feature maps and non-transformed feature maps, the error contributed by missing region can be solved.

The first structural feature masking section 411 masks the edge of each map for the source domain structural features $X^S$. The second structural feature masking section 412 masks the edge of each map for the target domain structural features $X^T$. The first converted feature masking section 421 masks the edge of each map for the transformed structural features from the first rigid transformation section 121. The second converted feature masking section 422 masks the edge of each map for the transformed structural features from the second rigid transformation section 122.

(Operation of Training Apparatus)

Figure 15:
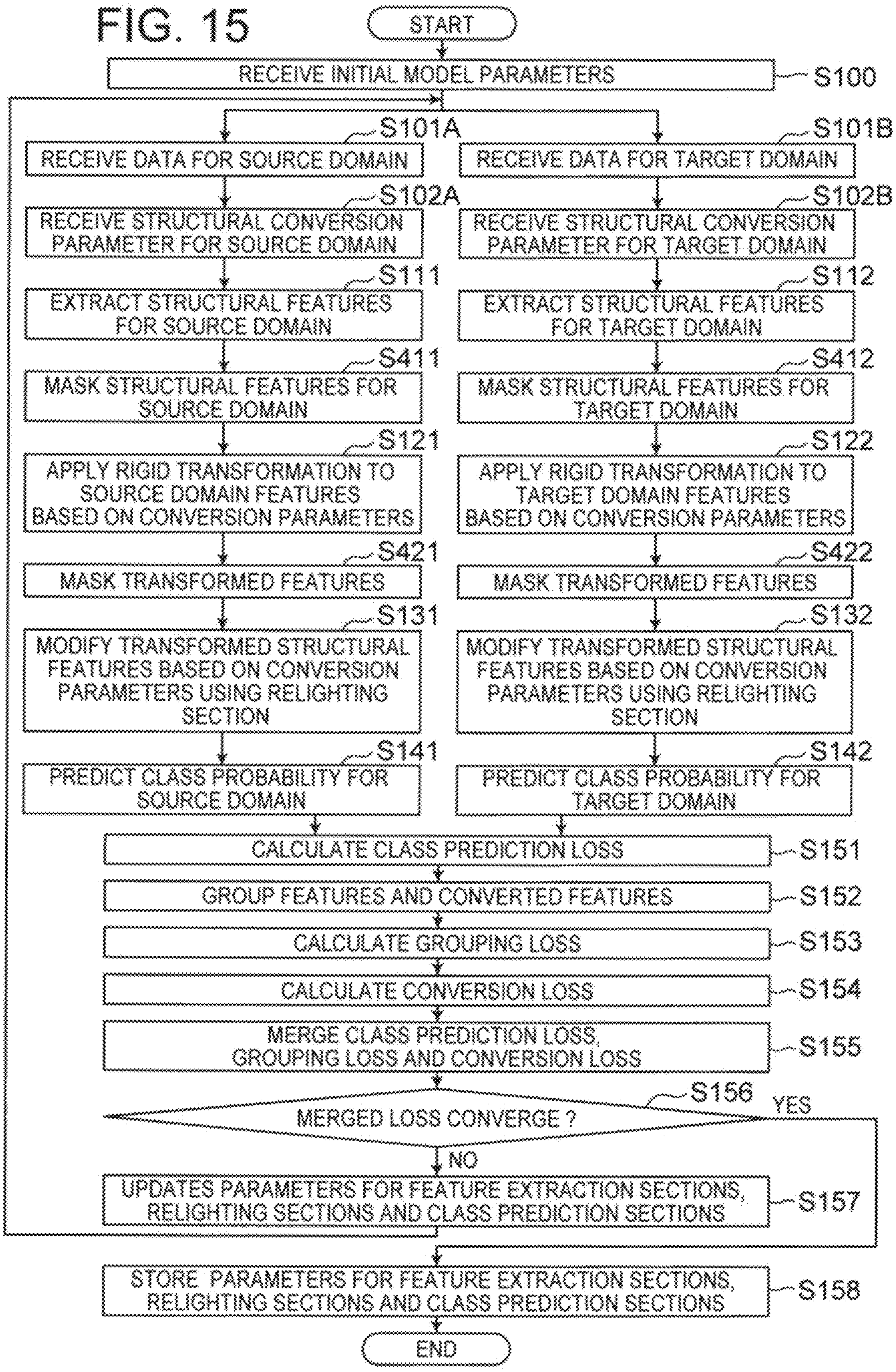
FIG. 15 is a flowchart showing an operation of the training device of the seventh example embodiment.

Next, the operation of the training device 106 will be explained with reference to the flowchart in FIG. 15. In this example embodiment, a process of step S411 is executed before the process of step S121, and a process of step S421 is executed before the process of step S131. A process of step S412 is executed before the process of step S122, and a process of step S422 is executed before the process of step S132.

In steps S411, S412, S421 and S422, the first structural feature masking section 411, the second structural feature masking section 412, the first converted feature masking section 421, and the second converted feature masking section 422 masks the edge of each map, as described above.

Technical Effects of the Present Example Embodiment

In this example embodiment, the error in the conversion loss calculated by the conversion loss calculator 154 can be reduced.

Each component in each of the above example embodiments may be configured with a piece of hardware or a piece of software. Alternatively, the components may be configured with a plurality of pieces of hardware or a plurality of pieces of software. Further, part of the components may be configured with hardware and the other part with software.

The functions (processes) in the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 16:
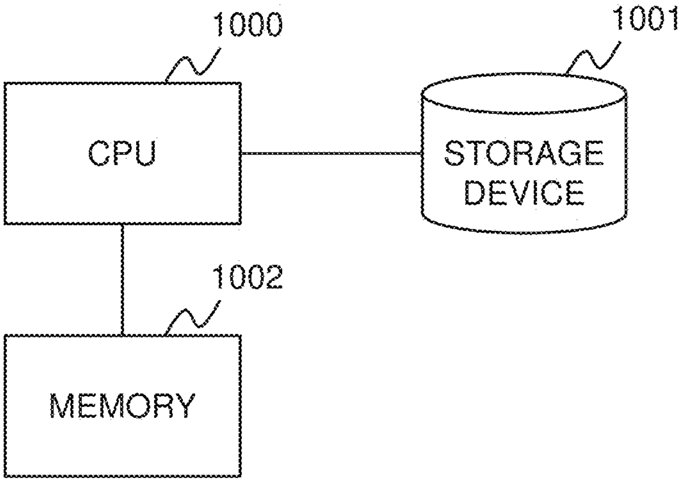
FIG. 16 is a block diagram showing an example of a computer with a CPU.

FIG. 16 is a block diagram showing an example of a computer with a CPU. The computer is implemented in a training apparatus or a classification apparatus. The CPU 1000 executes processing in accordance with a program stored in a storage device 1001 to realize the functions in the above example embodiments. That is to say, the computer can realize the functions of the feature extraction section 11, the rigid transformation section 12, the relighting section 13, the class prediction section 14, and the updating section 15 in the training apparatus shown in FIG. 1, by executing the program stored in the storage device.

The computer can also realize the functions of the first feature extraction section 111, the second feature extraction section 112, the first rigid transformation section 121, the second rigid transformation section 122, the first relighting section 131, the second relighting section 132, the first class prediction section 141, the second class prediction section 142, the updating section 150, the domain alignment section 211, the domain alignment loss computation section 212, the auxiliary task solvers 311, 312, the auxiliary loss computation sections 321, 322, the first structural feature masking section 411, the second structural feature masking section 412, the first converted feature masking section 421, and the second converted feature masking section 422 in the training apparatuses shown in FIGS. 5, 10, 12 and 14, by executing the program stored in the storage device.

The computer can realize the functions of the feature extraction section 61, the rigid transformation section 62, the relighting section 63, and the class prediction section 64 in the classification apparatuses shown in FIGS. 2 and 9, by executing the program stored in the storage device.

A storage device is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disc), a compact disc-read only memory (CD-ROM), a compact disc-recordable (CD-R), a compact disc-rewritable (CD-R/W), and a semiconductor memory (for example, a mask ROM, a programmable ROM (PROM), an erasable PROM (EPROM), a flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

A part of or all of the above example embodiments may also be described as, but not limited to, the following supplementary notes.

(Supplementary note 1) A training apparatus comprising:
- one or more feature extraction means for extracting source domain structural features from input source domain image data, and extracting target domain structural features from input target domain image data,
- rigid transformation means for generating transformed structural features by rigid transforming the structural features with reference to conversion parameters,
- one or more relighting means for generating new view features with reference to the transformed structural features and the conversion parameters in a way that the new view features approximate the structural features which are extracted from input image data at the views indicated by the conversion parameters,
- one or more class prediction means for predicting source domain class predictions from the source domain structural features and the source domain new view features, and predicting target domain class predictions from the target domain structural features and the target domain new view features, and
- updating means for updating at least one of the one or more feature extraction means, the one or more relighting means, and the one or more class prediction means.

(Supplementary note 2) The training apparatus according to Supplementary note 1, wherein
- the updating means executes updating process with reference to at least one or more following items;

i) a source domain classification loss computed with reference to the source domain class prediction values calculated by the class prediction means and the source domain ground truth class labels, ii) a target domain classification loss computed with reference to the target domain class prediction values calculated by the class prediction means and the target domain ground truth class labels, iii) a grouping loss computed with reference to at least one or more features from the source domain structural features, the source domain new view features, the target domain structural features, the target domain new view features and the corresponding class labels of each involved feature, iv) a conversion loss computed with reference to at least one or more features from the source domain structural features, the source domain new view features, the target domain structural features and the target domain new view features.

(Supplementary note 3) The training apparatus according to Supplementary note 2, further comprising
- merged loss computation means for calculating a merged loss with reference to the source domain classification loss, the target domain classification loss, the grouping loss, and the conversion loss, wherein
- when the merged loss is not converged, the updating means updates at least one of the one or more feature extraction means, the one or more relighting means, and the one or more class prediction means.

(Supplementary note 4) The training apparatus according to Supplementary note 3, further comprising
- classification loss computation means for calculating the source domain classification loss with reference to the source domain class prediction values, source domain class prediction values of the source domain new view features and source domain class label data, and calculating the target domain classification loss with reference to the target domain class prediction values, target domain class prediction values of the converted structural feature and target domain class label data.

(Supplementary note 5) The training apparatus according to Supplementary note 3 or 4, further comprising
- grouping means for generating class groups where each class group contains feature values sharing the same class label, from the source domain structural features, the converted source domain structural features, the target domain structural features, and the converted target domain structural features, and
- grouping loss computation means for calculating the grouping loss with reference to the class groups generated by the grouping means.

(Supplementary note 6) The training apparatus according to any one of Supplementary notes 3 to 5, further comprising
- conversion loss computation means for calculating the conversion loss with reference to at least one or more features from the source domain structural features, the source domain new view features, the target domain structural features and the target domain new view features.

(Supplementary note 7) The training apparatus according to any one of Supplementary notes 1 to 6, further comprising
- domain alignment means for carrying out a domain alignment process to align the target domain with the source domain, and domain alignment loss computation means for calculating a domain alignment loss according to a distance between the source domain and the target domain, wherein the merged loss computation means calculates the merged loss with reference to the domain alignment loss, and the updating means further updates the domain alignment means.

(Supplementary note 8) The training apparatus according to any one of Supplementary notes 1 to 6, further comprising an auxiliary task solver satisfies not only an ultimate classification goal but also some secondary goal, and auxiliary loss computation means for calculating an auxiliary loss, wherein the merged loss computation means calculates the merged loss with reference to the auxiliary loss, and the updating means further updates the auxiliary task solver.

(Supplementary note 9) The training apparatus according to any one of Supplementary notes 1 to 6, further comprising structural feature masking means for masking edges of maps for the structural features, and converted feature masking means for masking edges of maps for the converted structural features.

(Supplementary note 10) A classification apparatus comprising:

feature extraction means for extracting structural features from input image data, and class prediction means for predicting class prediction values from the feature values, wherein at least one of the feature extraction means and the class prediction means has been trained with reference to new view features obtained by converting the structural features.

(Supplementary note 11) A training method comprising:

extracting source domain structural features from input source domain image data, and extracting target domain structural features from input target domain image data, using one or more feature extraction means, generating transformed structural features by rigid transforming the structural features with reference to conversion parameters, using one or more rigid transformation means, generating new view features with reference to the transformed structural features and the conversion parameters in a way that the new view features approximate the structural features which are extracted from input image data at the views indicated by the conversion parameters, using one or more relighting means, predicting source domain class predictions from the source domain structural features and the source domain new view features, and predicting target domain class predictions from the target domain structural features and the target domain new view features, using one or more class prediction means, and updating at least one of the one or more feature extraction means, the one or more relighting means, and the one or more class prediction means.

(Supplementary note 12) The training method according to Supplementary note 11, wherein when executing updating process, updating at least one of the one or more feature extraction means, the one or more relighting means, and the one or more class prediction means with reference to at least one or more following items;

i) a source domain classification loss computed with reference to the source domain class prediction values calculated by the class prediction means and the source domain ground truth class labels, ii) a target domain classification loss computed with reference to the target domain class prediction values calculated by the class prediction means and the target domain ground truth class labels, iii) a grouping loss computed with reference to at least one or more features from the source domain structural features, the source domain new view features, the target domain structural features, the target domain new view features and the corresponding class labels of each involved feature, and iv) a conversion loss computed with reference to at least one or more features from the source domain structural features, the source domain new view features, the target domain structural features and the target domain new view features.

(Supplementary note 13) The training method according to Supplementary note 12, further comprising calculating a merged loss with reference to the source domain classification loss, the target domain classification loss, the grouping loss, and the conversion loss, wherein when the merged loss is not converged, at least one of the one or more feature extraction means, the one or more relighting means, and the one or more class prediction means is updated.

(Supplementary note 14) A classification method comprising:

extracting structural features from input image data, using feature extraction means, and predicting class prediction values from the feature values, using class prediction means, wherein at least one of the feature extraction means and the class prediction means has been trained with reference to new view features obtained by converting the structural features.

(Supplementary note 15) A computer readable information recording medium storing a training program causing a computer to execute:

extracting source domain structural features from input source domain image data, and extracting target domain structural features from input target domain image data, using one or more feature extraction means, generating transformed structural features by rigid transforming the structural features with reference to conversion parameters, using one or more rigid transformation means, generating new view features with reference to the transformed structural features and the conversion parameters in a way that the new view features approximate the structural features which are extracted from input image data at the views indicated by the conversion parameters, using one or more relighting means, predicting source domain class predictions from the source domain structural features and the source domain new view features, and predicting target domain class predictions from the target domain structural features and the target domain new view features, using one or more class prediction means, and updating at least one of the one or more feature extraction means, the one or more relighting means, and the one or more class prediction means.

(Supplementary note 16) The computer readable information recording medium according to Supplementary note 15, wherein the training program causes the computer to execute, when executing updating process, updating at least one of the one or more feature extraction means, the one or more relighting means, and the one or more class prediction means with reference to following items;

i) a source domain classification loss computed with reference to the source domain class prediction values calculated by the class prediction means and the source domain ground truth class labels, ii) a target domain classification loss computed with reference to the target domain class prediction values calculated by the class prediction means and the target domain ground truth class labels, iii) a grouping loss computed with reference to the source domain structural features and their corresponding class labels, the source domain converted structural features and their corresponding class labels, the target domain structural features and their corresponding class labels and the target domain converted structural features and their corresponding class labels, and iv) a conversion loss computed with reference to the source domain structural features, the source domain converted structural features, the target domain structural features and the target domain converted structural features.

(Supplementary note 17) A computer readable information recording medium storing a classification program causing a computer to execute:

extracting structural features from input image data, using feature extraction means, and predicting class prediction values from the feature values, using class prediction means, wherein at least one of the feature extraction means and the class prediction means has been trained with reference to new view features obtained by converting the structural features.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

10, 103-106 Training apparatus
11 Feature extraction section
12 Rigid transformation section
3 Relighting section
14 Class prediction section
15 Updating section
60, 70 Classification apparatus
61 Feature extraction section
62 Rigid transformation section
63 Relighting section
64 Class prediction section
111 First feature extraction section
112 Second feature extraction section
121 First rigid transformation section
122 Second rigid transformation section
131 First relighting section
132 Second relighting section
141 First class prediction section
142 Second class prediction section
150 Updating section
151 Classification loss computation section
152 Grouping section
153 Grouping loss computation section
154 Conversion loss computation section
155 Merged loss computation section
156 Model updating section
211 Domain alignment section
212 Domain alignment loss computation section
311, 312 Auxiliary task solver
321,322 Auxiliary loss computation section
411 First structural feature masking section
412 Second structural feature masking section
421 First converted feature masking section
422 Second converted feature masking section

What is claimed is:

1. A training apparatus comprising:

a memory storing software instructions, and one or more processors configured to execute the software instructions to implement one or more feature extraction sections, having learnable parameters, which extract source domain structural features from input source domain image data, and extract target domain structural features from input target domain image data, a rigid transformation section which generates transformed structural features by rigid transforming structural features with reference to conversion parameters, one or more relighting sections, having learnable parameters, which generate new view features with reference to the transformed structural features and the conversion parameters in a way that the new view features approximate the structural features which are extracted from input image data at the views indicated by the conversion parameters, one or more class prediction sections, having learnable parameters, which predict source domain class prediction values from the source domain structural features and the source domain new view features, and predict target domain class prediction values from the target domain structural features and the target domain new view features, and an updating section which updates parameter values of at least one of the one or more feature extraction means feature extraction sections, the one or more relighting sections, and the one or more class prediction sections.

2. The training apparatus according to claim 1, wherein the one or more processors are configured to execute the software instructions to execute updating process with reference to at least one or more following items;

i) a source domain classification loss computed with reference to the source domain class prediction values calculated by the class prediction section and the source domain ground truth class labels, ii) a target domain classification loss computed with reference to the target domain class prediction values calculated by the class prediction section and the target domain ground truth class labels, iii) a grouping loss computed with reference to at least one or more features from the source domain structural features, the source domain new view features, the target domain structural features, the target domain new view features and the corresponding class labels of each involved feature, iv) a conversion loss computed with reference to at least one or more features from the source domain structural features, the source domain new view features, the target domain structural features and the target domain new view features.

3. The training apparatus according to claim 2, wherein the one or more processors are further configured to execute the software instructions to calculate a merged loss with reference to the source domain classification loss, the target domain classification loss, the grouping loss, and the conversion loss, and wherein the one or more processors are configured to execute the software instructions to, when the merged loss is not converged, update at least one of the one or more feature extraction means feature extraction sections, the one or more relighting sections, and the one or more class prediction sections.

4. The training apparatus according to claim 3, wherein the one or more processors are further configured to execute the software instructions to calculate the source domain classification loss with reference to the source domain class prediction values of the source domain structural features, the source domain class prediction values of the source domain new view features and source domain class label data, and calculate the target domain classification loss with reference to the target domain class prediction values of the target domain structural features, the target domain class prediction values of the target domain new view features and target domain class label data.

5. The training apparatus according to claim 3, wherein the one or more processors are further configured to execute the software instructions to implement a grouping section which generates class groups where each class group contains feature values sharing a same class label, from the source domain structural features, the source domain new view features, the target domain structural features, and the target domain new view features, and the one or more processors are further configured to execute the software instructions to calculate the grouping loss with reference to the class groups generated by the grouping means section.

6. The training apparatus according to claim 3, wherein the one or more processors are further configured to execute the software instructions to calculate the conversion loss with reference to at least one or more features from the source domain structural features, the source domain new view features, the target domain structural features and the target domain new view features.

7. The training apparatus according to claim 1, wherein the one or more processors are further configured to execute the software instructions to implement a domain alignment section, having learnable parameters, which carries out a domain alignment process to align the target domain with the source domain, and wherein the one or more processors are further configured to execute the software instructions to calculate a domain alignment loss according to a distance between the source domain and the target domain, calculate the merged loss with reference to the domain alignment loss, and further update parameter values of the domain alignment means section.

8. The training apparatus according to claim 1, wherein the one or more processors are further configured to execute the software instructions to implement an auxiliary task solver which satisfies not only an ultimate classification goal but also some secondary goal, and wherein the one or more processors are further configured to execute the software instructions to calculate an auxiliary loss, wherein calculate the merged loss with reference to the auxiliary loss, and further update the auxiliary task solver.

9. The training apparatus according to claim 1, wherein the one or more processors are further configured to execute the software instructions to mask edges of maps for the structural features, and mask edges of maps for the new view features.

10. A training method comprising:

extracting source domain structural features from input source domain image data, and extracting target domain structural features from input target domain image data, using one or more feature extraction sections having learnable parameters, generating transformed structural features by rigid transforming the structural features with reference to conversion parameters, using one or more rigid transformation sections, generating new view features with reference to the transformed structural features and the conversion parameters in a way that the new view features approximate the structural features which are extracted from input image data at the views indicated by the conversion parameters, using one or more relighting sections having learnable parameters, predicting source domain class prediction values from the source domain structural features and the source domain new view features, and predicting target domain class prediction values from the target domain structural features and the target domain new view features, using one or more class prediction sections having learnable parameters, and updating parameter values of at least one of the one or more feature extraction sections, the one or more relighting sections, and the one or more class prediction sections.

11. The training method according to claim 10, wherein when executing updating process, updating at least one of the one or more feature extraction sections, the one or more relighting sections, and the one or more class prediction sections with reference to at least one or more following items;

i) a source domain classification loss computed with reference to the source domain class prediction values calculated by the class prediction section and source domain ground truth class labels, ii) a target domain classification loss computed with reference to the target domain class prediction values calculated by the class prediction section and target domain ground truth class labels, iii) a grouping loss computed with reference to at least one or more features from the source domain structural features, the source domain new view features, the target domain structural features, the target domain new view features and the corresponding class labels of each involved feature, and iv) a conversion loss computed with reference to at least one or more features from the source domain structural features, the source domain new view features, the target domain structural features and the target domain new view features.

12. The training method according to claim 11, further comprising calculating a merged loss with reference to the source domain classification loss, the target domain classification loss, the grouping loss, and the conversion loss, wherein when the merged loss is not converged, at least one of the one or more feature extraction sections, the one or more relighting sections, and the one or more class prediction sections is updated.

* * * * *